(12) United States Patent
Yun et al.

(10) Patent No.: US 11,012,914 B2
(45) Date of Patent: May 18, 2021

(54) METHOD AND APPARATUS FOR CONFIGURING PATH IN COMMUNICATION SYSTEM INCLUDING XHAUL NETWORK

(71) Applicant: Electronics and Telecommunications Research Institute, Daejeon (KR)

(72) Inventors: Mi Young Yun, Daejeon (KR); Won Ik Kim, Daejeon (KR); Jae Heung Kim, Daejeon (KR); Seung Kwon Baek, Daejeon (KR); Jae Su Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 11 days.

(21) Appl. No.: 16/403,179

(22) Filed: May 3, 2019

(65) Prior Publication Data

US 2019/0342816 A1 Nov. 7, 2019

(30) Foreign Application Priority Data

May 4, 2018 (KR) ........................ 10-2018-0051645

(51) Int. Cl.
*H04W 40/02* (2009.01)
*H04W 40/24* (2009.01)

(52) U.S. Cl.
CPC ........... *H04W 40/02* (2013.01); *H04W 40/24* (2013.01)

(58) Field of Classification Search
CPC ........ H04L 45/22; H04L 45/28; H04W 40/02; H04W 40/24
See application file for complete search history.

(56) References Cited

U.S. PATENT DOCUMENTS 9,258,037 B2 2/2016 Park et al.
9,432,888 B2 8/2016 Wi et al.
(Continued)

FOREIGN PATENT DOCUMENTS

KR 1020150086171 A 7/2015
KR 1020170109979 A 10/2017

OTHER PUBLICATIONS

Grass et. al. "Dynamically Reconfigurable Optical-Wireless Backhaul/Fronthaul with Cognitive Control Plane for Small Cells and Cloud-RANs" (Year: 2015).*

(Continued)

*Primary Examiner* — Kashif Siddiqui
(74) *Attorney, Agent, or Firm* — William Park & Associates Ltd.

(57) ABSTRACT

Disclosed are a method and an apparatus for configuring a path in a communication system including an Xhaul network. A method for changing a path, performed by a first XDU, may comprise receiving from the XCU a path setup request message requesting to change a first path between the second XDU and the third XDU to a second path between the first XDU and the third XDU; receiving an SN status transfer message including an SN of data for the third XDU from the second XDU belonging to the first path, when the path setup request message is received; receiving from the second XDU the data corresponding to the SN indicated by the SN status transfer message; configuring the second path with the third XDU; and transmitting the data received from the second XDU to the third XDU through the second path.

5 Claims, 23 Drawing Sheets

(56) References Cited

U.S. PATENT DOCUMENTS

| | | |
|---|---|---|
| 9,729,388 B2 | 8/2017 | Kim et al. |
| 2012/0264430 A1 | 10/2012 | Kim et al. |
| 2017/0238362 A1 | 8/2017 | Karandikar et al. |
| 2019/0110209 A1* | 4/2019 | Senior .................. H04B 7/0617 |
| 2019/0166518 A1* | 5/2019 | Arora ................ H04W 28/0268 |
| 2019/0342816 A1* | 11/2019 | Yun ....................... H04W 40/02 |

OTHER PUBLICATIONS

Grass et. al. "5G-XHaul: A novel wireless-optical SDN transport network to support joint 5G backhaul and fronthaul services" (Year: 2018).*

Giatsios et. al. "SDN Implementation of Slicing and Fast Failover in 5G Transport Networks" (Year: 2017).*

Miyoung Yun et al., Unified transport protocol supporting multi-hop in mobile xhaul network, Proceedings of the Korean Institute of Communication Sciences Conference, 2017, pp. 1319-1320, Korean Institute of Communication Sciences, ETRI, Korea.

* cited by examiner

—··— : RADIO LINK

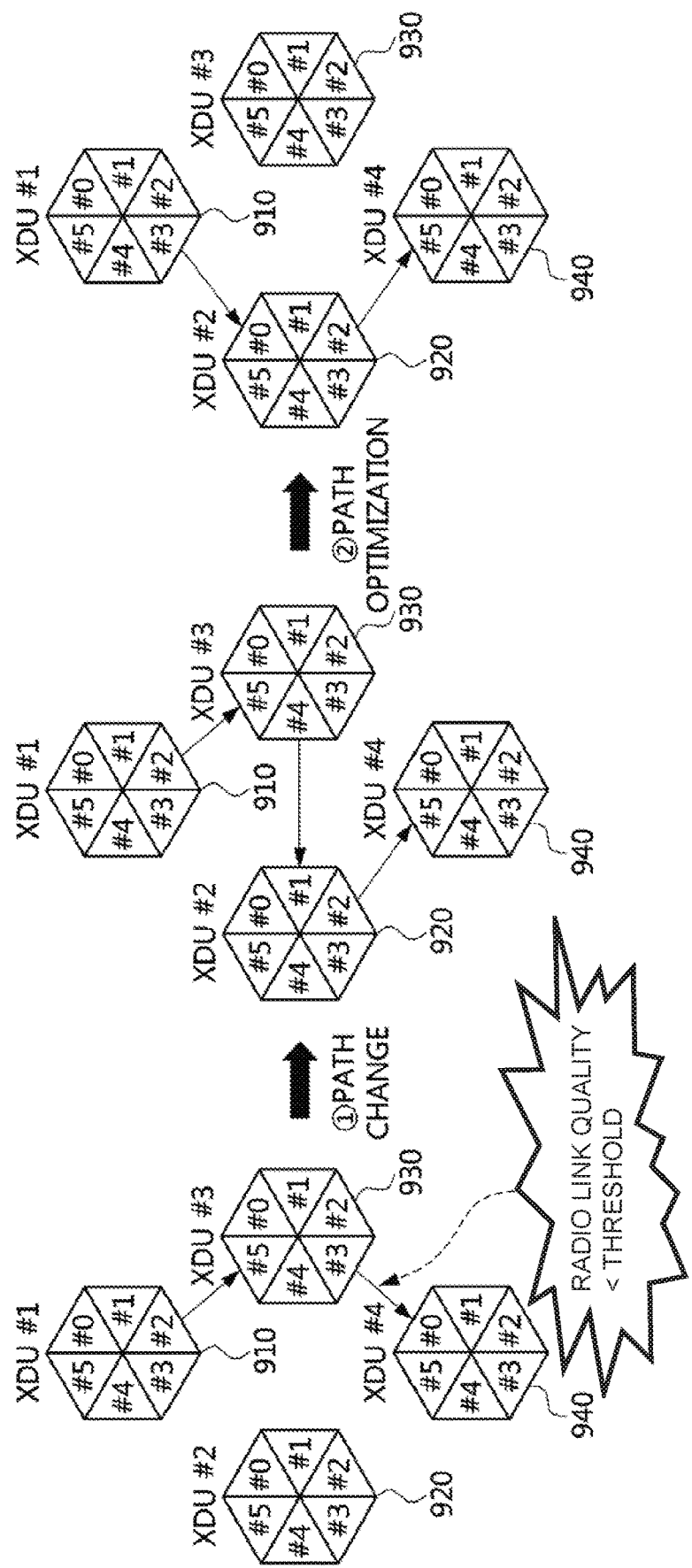

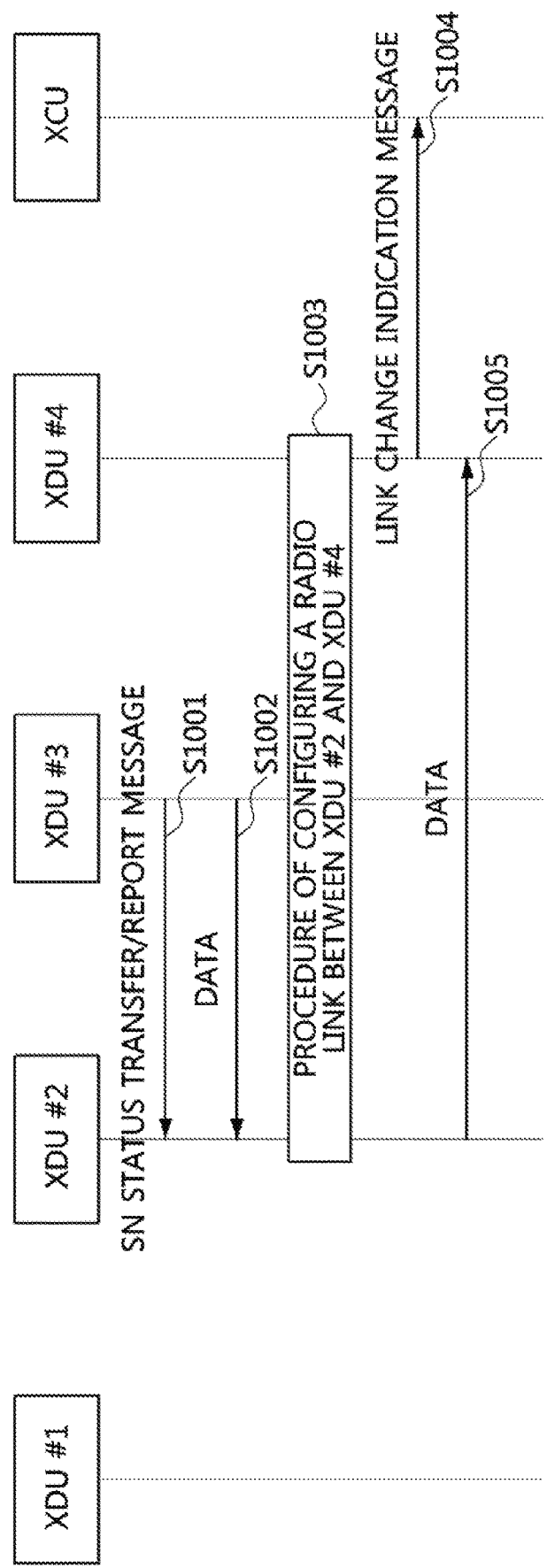

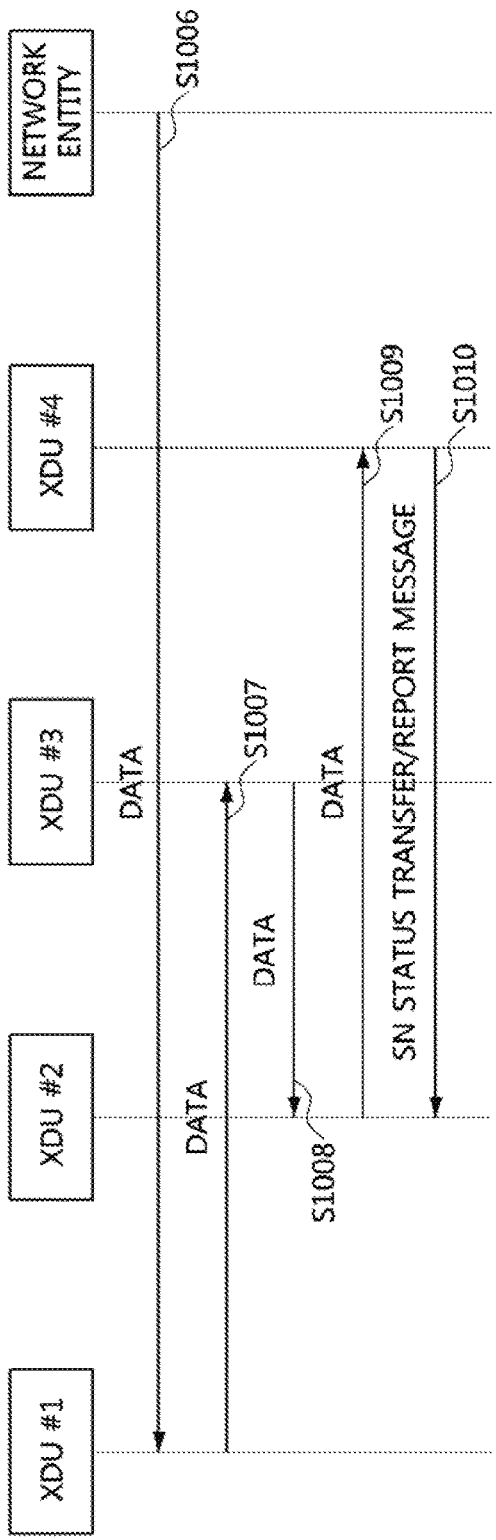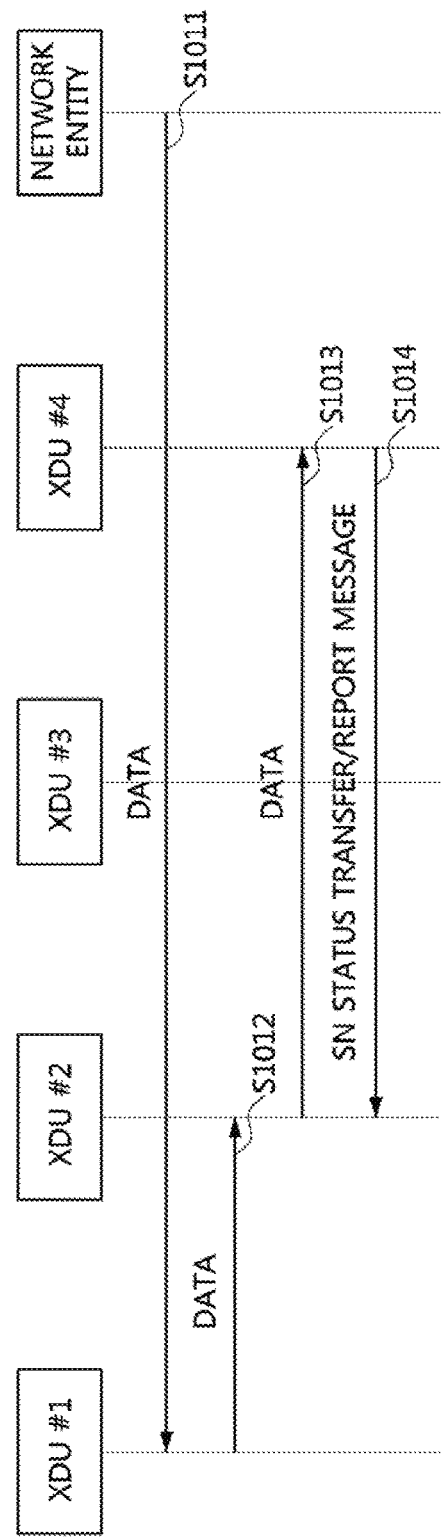

BACKUP PATH #A1

BACKUP PATH #B1

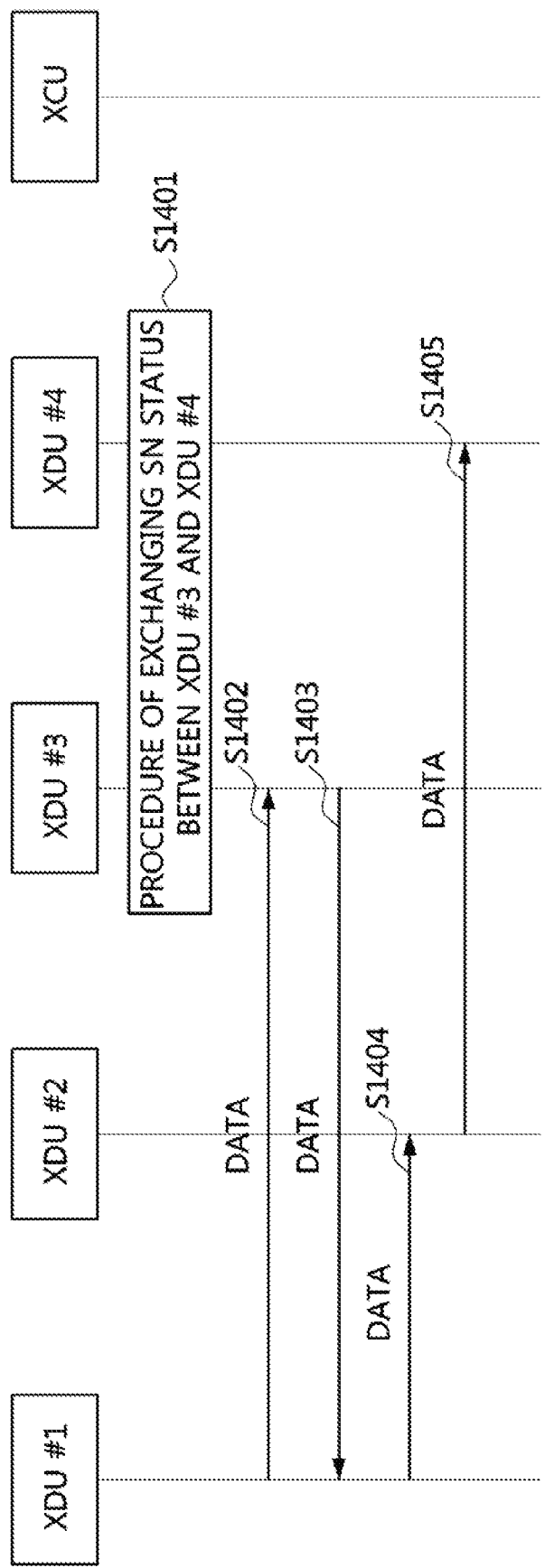

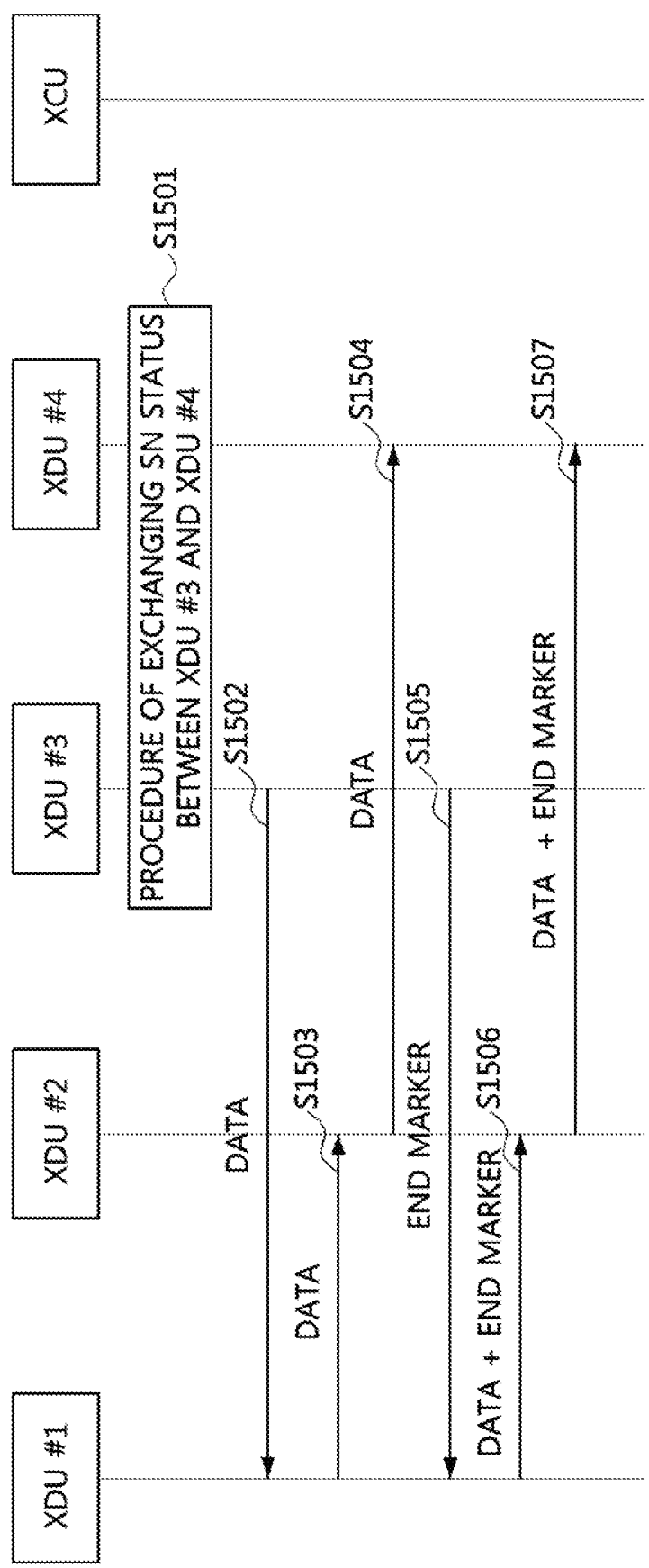

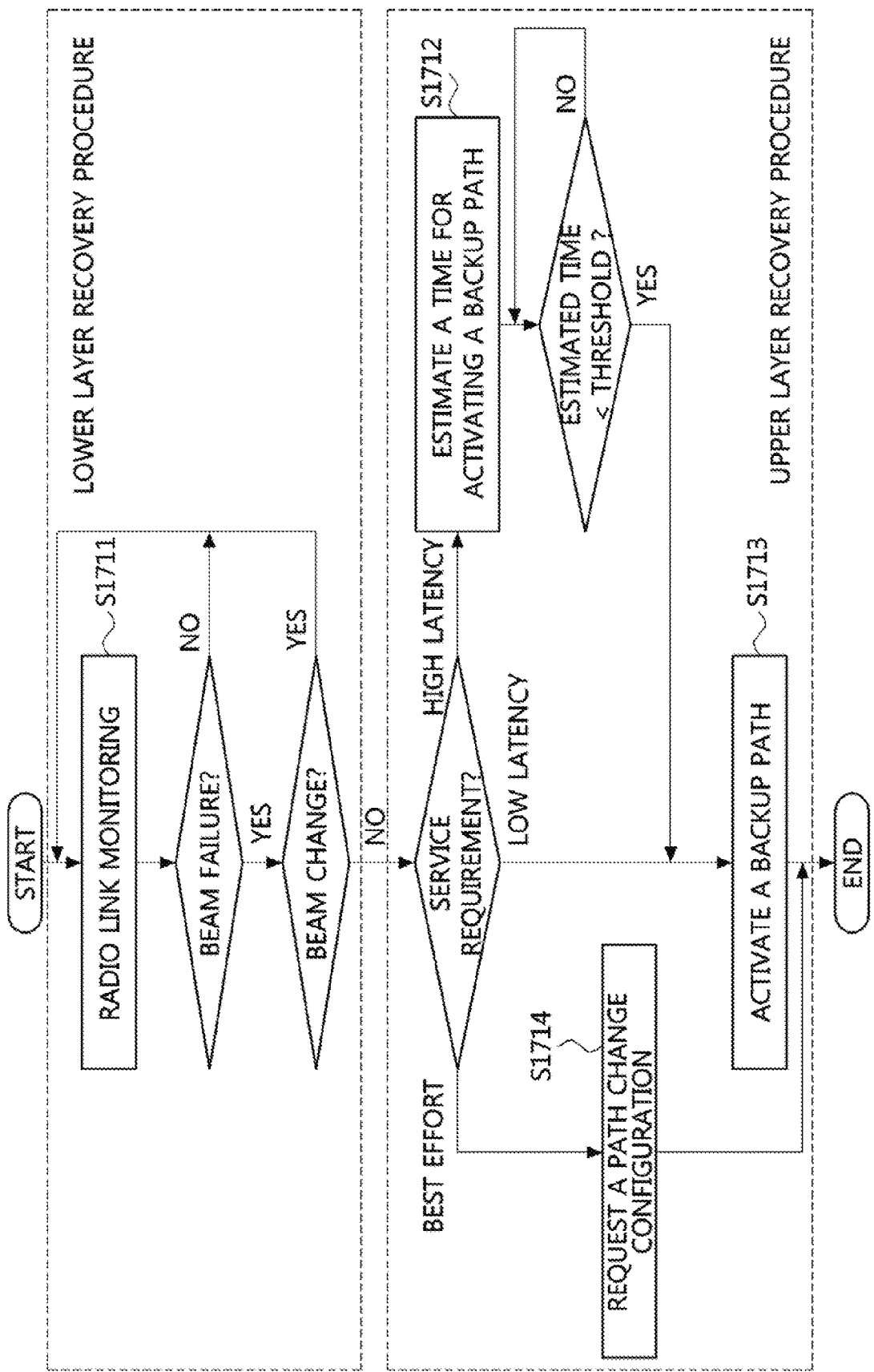

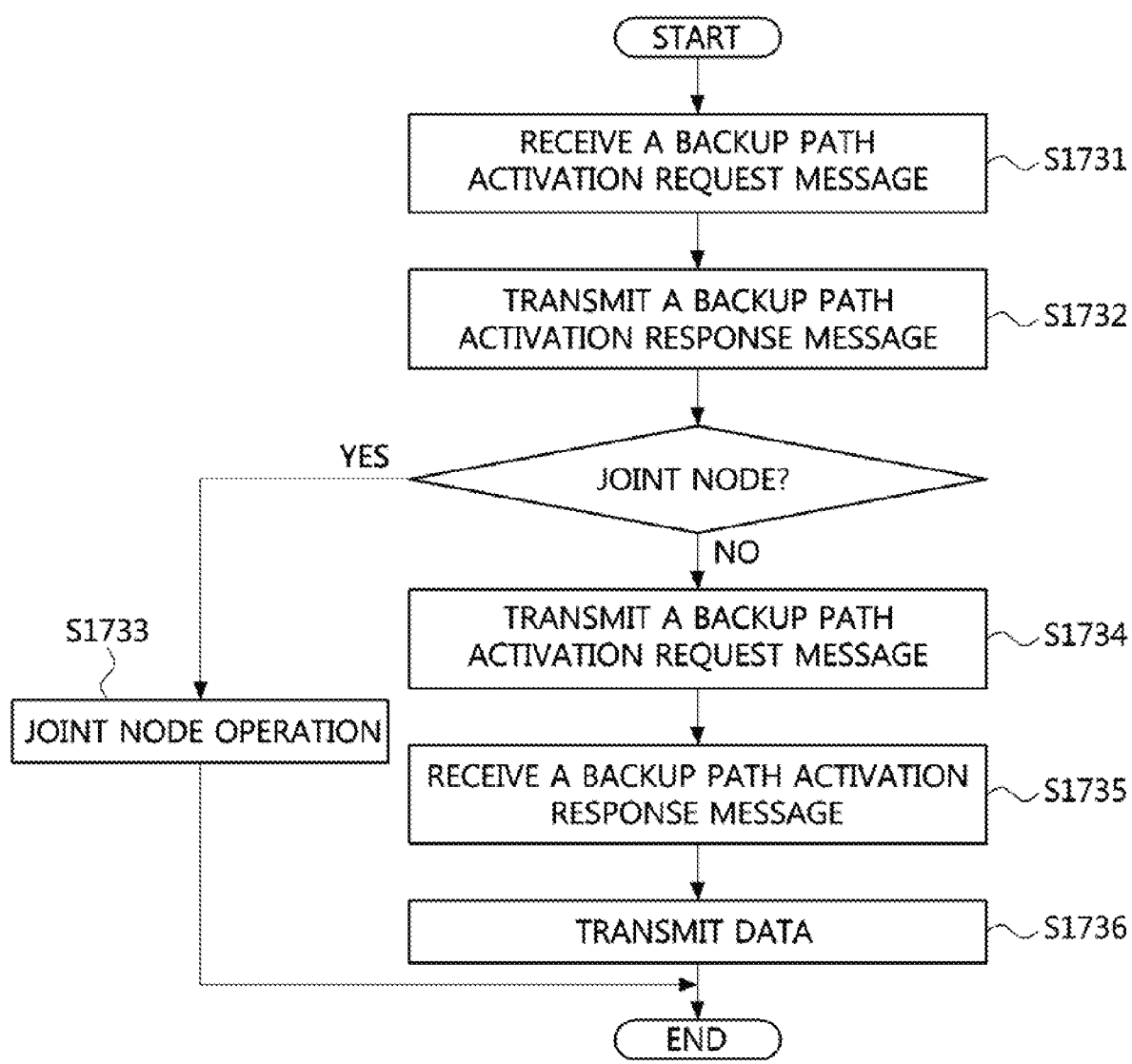

METHOD AND APPARATUS FOR CONFIGURING PATH IN COMMUNICATION SYSTEM INCLUDING XHAUL NETWORK

CROSS-REFERENCE TO RELATED APPLICATIONS

This application claims priority to Korean Patent Application No. 10-2018-0051645 filed on May 4, 2018 in the Korean Intellectual Property Office (KIPO), the entire contents of which are hereby incorporated by reference.

BACKGROUND

1. Technical Field

The present disclosure relates to a technique for configuring a path in a communication system, and more particularly, to a technique for configuring a control path and a traffic path between communication nodes in a communication system including an access network, an Xhaul network, and a core network.

2. Related Art

A communication system (hereinafter, an 'integrated communication system') using a higher frequency band (e.g., a frequency band of 6 GHz or higher) than a frequency band (e.g., a frequency band lower below 6 GHz) of a long term evolution (LTE) based communication system (or, a LTE-A based communication system) is being considered for processing of soaring wireless data. The reception performance of a signal may deteriorate due to path loss of a radio wave and reflection of the radio wave in such the high frequency band (e.g., a frequency band of 6 GHz or higher), and a small base station supporting smaller cell coverage than that of a macro base station can be introduced into the integrated communication system in order to solve this problem. In the integrated communication system, the small base station may be connected to a core network using a backhaul link.

Meanwhile, the integrated communication system may comprise the small base station performing all the functions of a communication protocol (e.g., a remote radio transmission and reception function, a baseband processing function), a plurality of transmission reception points (TRPs) performing the remote radio transmission and reception function among the functions of the communication protocol, a baseband unit (BBU) block performing the baseband processing function among the functions of the communication protocol, and the like. The TRP may be a remote radio head (RRH), a radio unit (RU), or the like. The BBU block may include at least one BBU or at least one digital unit (DU). The BBU block may be referred to as a 'BBU pool', a 'centralized BBU', or the like. One BBU block may be connected to a plurality of TRPs, and perform the baseband processing function on signals received from the plurality of TRPs and signals to be transmitted to the plurality of TRPs.

In a communication system, a small base station may be connected to the core network using a backhaul link, a TRP may be connected to a BBU block using a fronthaul link, and the BBU block may be connected to the core network using a backhaul link. Here, a network formed on the basis of the fronthaul link and the backhaul link may be referred to as an 'Xhaul network'. The Xhaul network may be located between the access network (e.g., a network between the small base station (or, TRP) and the terminal) and the core network, may transmit signals received from the core network to the access network, and may transmit signals received from the access network to the core network. The Xhaul network may include a plurality of communication nodes, and methods for configuring a new path are needed when a communication node is added or removed, a handover between the communication nodes is performed, a load balancing between the communication node is required, or a change of an original path is required according to a radio link state of the communication node.

SUMMARY

Accordingly, embodiments of the present disclosure provide a method for configuring a path between communication nodes based on a radio link state in a communication system including an Xhaul network.

In order to achieve the objective of the present disclosure, a method for changing a path, performed by a first Xhaul distributed unit (XDU) in an Xhaul network including the first XDU, a second XDU, a third XDU, and an Xhaul centralized unit (XCU), may comprise: receiving from the XCU a path setup request message requesting to change a first path between the second XDU and the third XDU to a second path between the first XDU and the third XDU; receiving a sequence number (SN) status transfer message including an SN of data for the third XDU from the second XDU belonging to the first path, when the path setup request message is received; receiving from the second XDU data corresponding to the SN indicated by the SN status transfer message; configuring the second path with the third XDU; and transmitting the data received from the second XDU to the third XDU through the second path.

The path setup request message may include identifiers of XDUs constituting the second path.

The SN status transfer message may be transmitted and received based on a flow identifier (ID) without control of the XCU.

The SN may indicate an SN of a packet data convergence protocol (PDCP) layer or a MUTP layer.

The data transmitted through the second path may be PDCP data when the SN indicates an SN of the PDCP layer, and the data transmitted through the second path may be MUTP data when the SN indicates an SN of the MUTP layer.

The method may further comprise transmitting to the third XDU an end marker message indicating that the data is last data of the first path through the second path.

When a quality of the first path is equal to or less than a preconfigured threshold according to movement of the third XDU, a path for the third XDU may be changed from the first path to the second path.

When the configuration of the second path is completed, a path change indication message indicating that a path for the third XDU is changed from the first path to the second path may be transmitted to the XCU.

In order to achieve the objective of the present disclosure, a method for changing a path, performed by an Xhaul centralized unit (XCU) in an Xhaul network including the XCU and a plurality of Xhaul distributed units (XDUs) including a first XDU, a second XDU, a third XDU, and a fourth XDU, may comprise: when a path of (the first XDU-the third XDU-the fourth XDU) is changed to a path of (the first XDU-the second XDU-the fourth XDU), transmitting to the first XDU a path change request message requesting to delete a path of (the first XDU-the third XDU) and configure a path of (the first XDU-the second XDU);

receiving from the first XDU a path change response message indicating that the deletion of the path of (the first XDU-the third XDU) and the configuration of the path of (the first XDU-the second XDU) are completed; transmitting to the third XDU a path delete request message requesting to delete a path of (the third XDU-the fourth XDU); receiving from the third XDU a path delete response message indicating that the deletion of the path of (the third XDU-the fourth XDU) is completed; transmitting to the second XDU a path setup request message to requesting to configure a path of (the second XDU-the fourth XDU); and receiving from the second XDU a path setup response message indicating that the configuration of the path of (the second XDU-the fourth XDU) is completed.

Each of the path change request message and the path setup request message may include identifiers of the XDUs constituting the path of (the first XDU-the second XDU-the fourth XDU).

The path of (the first XDU-the third XDU) may not be deleted when the path of (the first XDU-the third XDU) is used for a flow identifier (ID) other than a flow ID indicated by the path change request message, and the path of (the third XDU-the fourth XDU) may not be deleted when the path of (the third XDU-the fourth XDU) is used for a flow ID other than a flow ID indicated by the path deletion request message.

Before the deletion of the path of (the first XDU-the third XDU), data stored in a buffer of the first XDU may be transmitted to the third XDU, and an end marker message indicating that data does not exist in the buffer of the first XDU may be transmitted to the third XDU.

Before the deletion of the path of (the third XDU-the fourth XDU), data stored in a buffer of the third XDU may be transmitted to the fourth XDU, and an end marker message indicating that data does not exist in the buffer of the third XDU may be transmitted to the fourth XDU.

A reordering operation for data received through the path of (the first XDU-the third XDU-the fourth XDU) and data received through the path of (the first XDU-the second XDU-the fourth XDU) may be performed in the fourth XDU.

A flow ID of the path of (the first XDU-the third XDU-the fourth XDU) may be different from a flow ID of the path of (the first XDU-the second XDU-the fourth XDU).

In order to achieve the objective of the present disclosure, a method for changing a path, performed by a first Xhaul distributed unit (XDU) in an Xhaul network including an Xhaul centralized unit (XCU) and a plurality of XDUs including the first XDU, a second XDU, a third XDU, and a fourth XDU, wherein an original path is a path of (the first XDU-the third XDU-the fourth XDU) and a backup path for the original path is a path of (the first XDU-the second XDU-the fourth XDU), may comprise: activating a forwarding table indicating a forwarding rule in the backup path when a loss of a path of (the first XDU-the third XDU) is detected; performing an activation procedure of a path of (the first XDU-the second XDU) belonging to the backup path with the second XDU; and transmitting to the XCU a backup path activation notification message indicating that the activation of the path of (the first XDU-the second XDU) is complete.

The backup path may be configured for each flow identifier (ID).

The performing an activation procedure with the second XDU may further comprise transmitting to the second XDU a backup path activation message including a flow ID, an initiator XDU sector ID, a target XDU sector ID, and a reason code; and receiving from the second XDU a backup path activation response message in response to the backup path activation message.

The method may further comprise performing a procedure for exchanging a sequence number (SN) status with the third XDU.

The backup path may be preconfigured by the XCU, and the change from the original path to the backup path may be performed without control of the XCU.

According to the embodiments of the present disclosure, the communication system may include an access network, an Xhaul network, and a core network, and a handover between Xhaul distributed units (XDUs) may be performed according to movement of a moving XDU in the Xhaul network. In this case, a sequence number (SN) may be exchanged between the XDUs participating in the handover, so that a loss of data can be minimized. Also, when an original path between the XDUs in the Xhaul network is changed to a new path, a path change procedure can be performed under the control of an Xhaul centralized unit (XCU). In this case, the loss of data in the path change procedure can be minimized. Further, a backup path for the original path can be preconfigured in the Xhaul network, in which case the path change from the original path to the backup path can be performed without the control of the XCU. Therefore, the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 9 is a conceptual diagram illustrating a first embodiment of a path change method according to a handover in an Xhaul network;

FIG. 10A is a sequence chart illustrating a first embodiment of a path change method according to a handover in an Xhaul network;

FIG. 10B is a sequence chart illustrating a first embodiment of a communication method in the changed path;

FIG. 10C is a sequence chart illustrating a second embodiment of a communication method in the changed path;

FIG. 14 is a sequence chart illustrating a first embodiment of a data transmission method in the backup path #A2;

FIG. 15 is a sequence chart illustrating a first embodiment of a data transmission method in the backup path #B2;

FIG. 17A is a flow chart illustrating a first embodiment of a path change method in an Xhaul network;

FIG. 17C is a flow chart illustrating a second embodiment of a method of transmitting and receiving data through a backup path in an Xhaul network.

DETAILED DESCRIPTION

Figure 1:
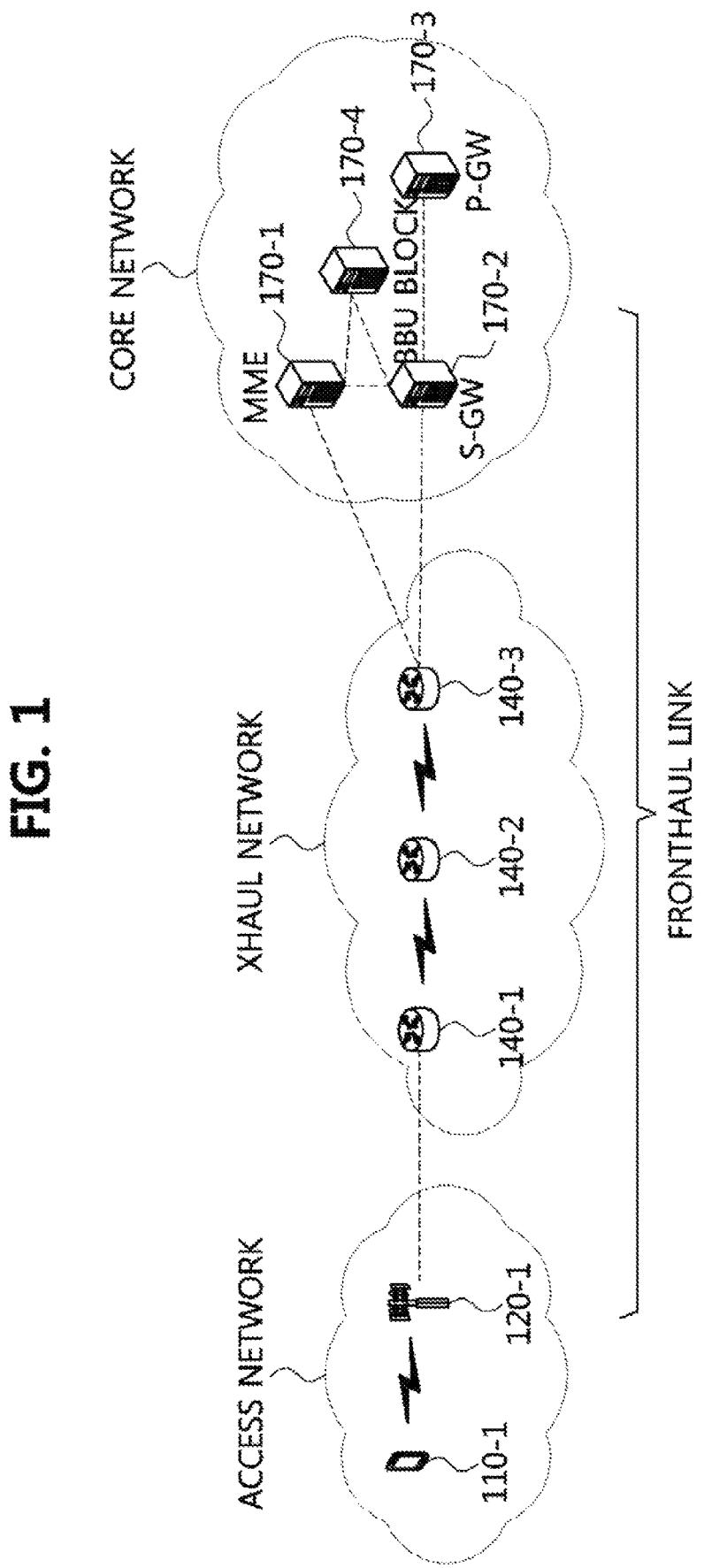
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication system may include an access network, an Xhaul network, a core network, and the like. The access network may include a terminal 110-1, a transmission reception point (TRP) 120-1, and the like. The TRP 120-1 may perform radio transmission and reception functions, and may be referred to as a 'flexible TRP (f-TRP)'. The TRP 120-1 may provide communication services to the terminal 110-1, and may be connected to an Xhaul distributed unit (XDU) 140-1 of the Xhaul network. The baseband processing functions for the TRP 120-1 may be performed in a baseband unit (BBU) block 170-4.

A link (e.g., (TRP 120-1-XDU 140-1-XDU 140-2-XDU 140-3-BBU block 170-4)) between the TRP 120-1 performing the radio transmission and reception functions and the BBU block 170-4 performing the baseband processing functions may be referred to as a 'fronthaul link'. The fronthaul link may vary depending on a network (e.g., Xhaul network or core network) to which the BBU block 170-4 that performs the baseband processing functions belongs. The access network may support a cellular communication protocol, a wireless local area network (WLAN) protocol, or the like. The cellular communication protocol may be a 4G communication protocol (e.g., a long term evolution (LTE) protocol, an LTE-advanced (LTE-A) protocol), a 5G communication protocol (e.g., a new radio (NR) communication protocol), or the like.

The Xhaul network may be located between the access network and the core network, and may support communications between the access network and the core network. The Xhaul network may transmit signals received from the core network to the access network, and may transmit signals received from the access network to the core network. The Xhaul network may include a plurality of XDUs 140-1, 140-2, and 140-3. The plurality of XDUs 140-1, 140-2, and 140-3 may perform radio transmission and reception functions, and may be connected in a multi-hop scheme.

Among the plurality of XDUs 140-1, 140-2 and 140-3, an XDU located at a starting point of a transmission path may be referred to as an 'ingress XDU', an XDU located at an ending point of a transmission path may be referred to as an 'egress XDU', and an XDU connected to an Xhaul centralized unit (XCU) may be referred to as an 'XDU aggregator'. An XDU connected to a termination communication node (e.g., mobile management entity (MME) 170-1 or serving-gateway (S-GW) 170-2) of the core network may also be referred to as the 'XDU aggregator'. The XCU may perform a topology management function, a transmission path management function, and control functions of the XDUs 140-1, 140-2, and 140-3.

When the communication system supports the 4G communication protocol, the core network may include the MME 170-1, the S-GW 170-2, a packet data network (PDN) gateway (P-GW) 170-3, the BBU block 170-4, and the like. When the communication system supports the 5G communication protocol, the core network may include an access and mobility management function (AMF), a user plane function (UPF), a session management function (SMF), the BBU block 170-4, and the like. Each of the AMF, the UPF, and the SMF may correspond to each of the MME 170-1, the S-GW 170-2, and the P-GW 170-3.

The BBU block 170-4 may be located in the MME 170-1 or the S-GW 170-2, and may be connected to the XDU 140-3 via a wired link. The BBU block 170-4 may include at least one BBU or at least one digital unit (DU). The BBU block 170-4 may be referred to as a 'BBU pool', a 'centralized BBU', or the like. The link between the TRP 120-1 and the BBU block 170-4 may be referred to as the fronthaul link, and the TRP 120-1 may be connected to the BBU block 170-4 through the fronthaul link.

The XDU 140-1 of the Xhaul network may be connected to the TRP 120-1. Alternatively, the XDU 140-1 may be configured to be integrated into the TRP 120-1. The XDU 140-2 may be connected to each of the XDU 140-1 and the XDU 140-3 using an Xhaul link, and the XDU 140-3 may be connected to a termination communication node (e.g., MME 170-1 or S-GW 170-2) of the core network. The Xhaul link may include the fronthaul link, the backhaul link, and the like. Communications between the plurality of XDUs 140-1, 140-2, and 140-3 may be performed using a communication protocol for the Xhaul link (hereinafter referred to as an 'Xhaul protocol'). A packet to which the Xhaul protocol is applied may be transmitted through the Xhaul link to each of the core network and the access network. Here, the packet may indicate control information, data, and the like.

Figure 2:
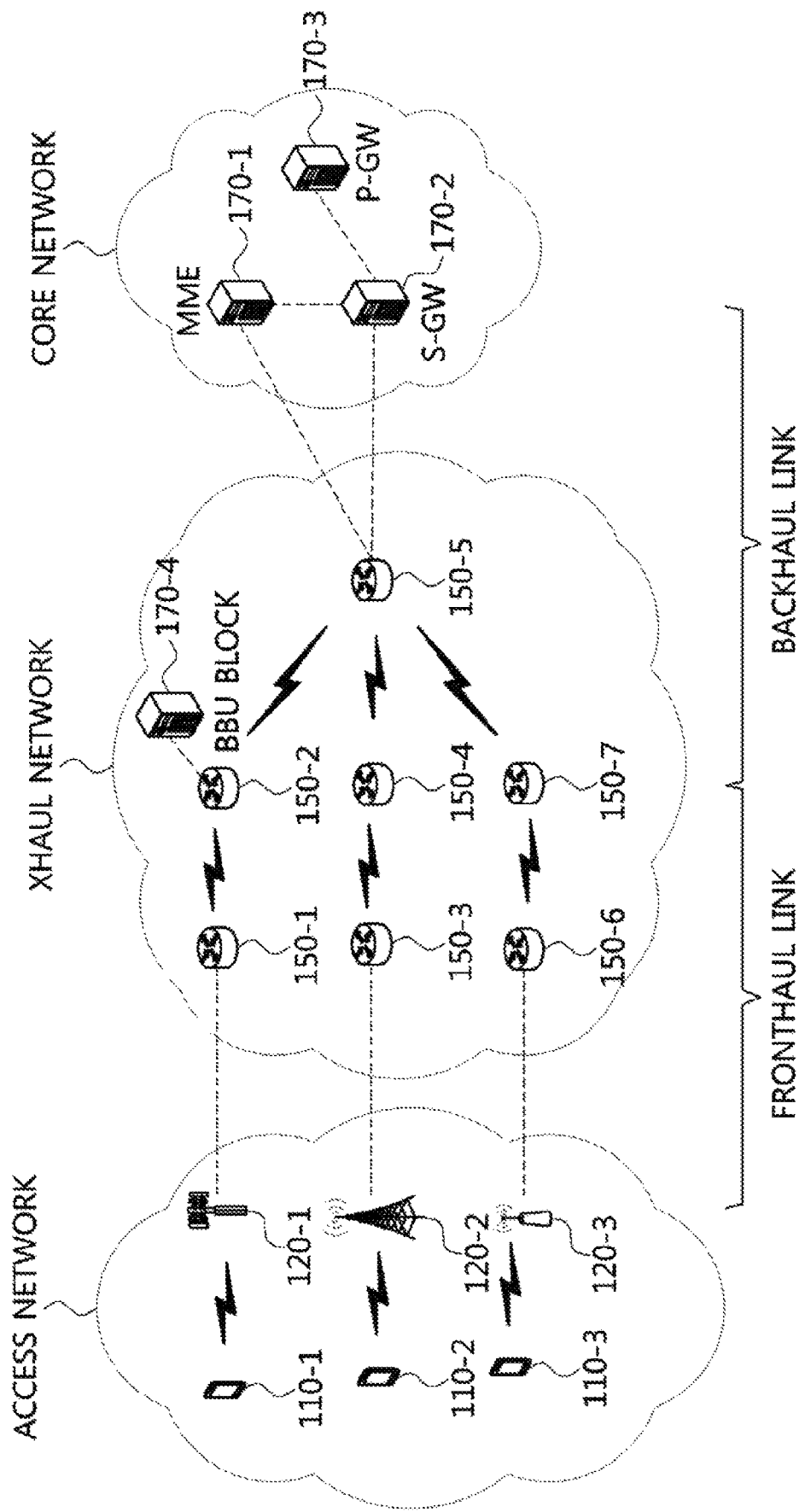
FIG. 2 is a conceptual diagram illustrating a second embodiment of a communication system.

FIG. 2 is a conceptual diagram illustrating a second embodiment of a communication system.

Referring to FIG. 2, a communication system may include an access network, an Xhaul network, a core network, and the like. The Xhaul network may be located between the access network and the core network, and may support communications between the access network and the core network. The access network may include terminals 110-1, 110-2, and 110-3, a TRP 120-1, a macro base station 120-2, a small base station 120-3, and the like.

The Xhaul network may include a plurality of XDUs 150-1, 150-2, 150-3, 150-4, 150-5, 150-6, and 150-7. In the Xhaul network, the XDUs 150-1, 150-2, 150-3, 150-4, 150-5, 150-6, and 150-7 may be connected using Xhaul links and may be connected in a multi-hop scheme. The BBU block 170-4 may be located in one XDU among the plurality of XDUs 150-1, 150-2, 150-3, 150-4, 150-5, 150-6, and 150-7. For example, the BBU block 170-4 may be located in the XDU 150-2. When the communication system supports the 4G communication protocol, the core network may include the MME 170-1, the S-GW 170-2, and the P-GW 170-3. When the communication system supports the 5G communication protocol, the core network may include the AMF, the UPF, and the SMF.

The XDU 150-1 of the Xhaul network may be connected to the TRP 120-1, the XDU 150-3 of the Xhaul network may be connected to the macro base station 120-2, and the XDU 150-6 of the Xhaul network may be connected to the small base station 120-3. The XDU 150-5 of the Xhaul network may be connected to a termination communication node (e.g., MME 170-1, S-GW 170-2) of the core network, and may be referred to as an 'XDU aggregator'. Communications between the plurality of XDUs 150-1, 150-2, 150-3, 150-4, 150-5, 150-6, and 150-7 may be performed using the Xhaul protocol. A packet (e.g., data, control information, etc.) to which the Xhaul protocol is applied may be transmitted to each of the core network and the access network through the Xhaul link.

The TRP 120-1 may provide communication services to the terminal 110-1 using a cellular communication protocol. The TRP 120-1 may support radio transmission and reception functions, and the baseband processing functions for the TRP 120-1 may be performed in the BBU block 170-4. A link (e.g., (TRP 120-1-XDU 150-1-BBU block 170-4 (or, XDU 150-2))) between the TRP 120-1 performing the radio transmission and reception functions and the BBU block 170-4 performing the baseband processing functions may be referred to as a 'fronthaul link', and a link (e.g., (BBU 170-4 (or, XDU 150-2)-XDU 150-5-MME 170-1 (or, S-GW 170-2))) between the BBU block 170-4 and a termination communication node (e.g., MME 170-1 or S-GW 170-2) of the core network may be referred to as a 'backhaul link'. For example, the fronthaul link may be configured differently depending on the location (e.g., Xhaul network or core network) of the BBU block 170-4 performing the baseband processing functions.

The macro base station 120-2 may provide communication services to the terminal 110-2 using a cellular communication protocol. The macro base station 120-2 may be connected to the core network through the Xhaul network, and a link of (macro base station 120-2-XDU 150-3-XDU 150-4-XDU 150-5-MME 170-1 (or, S-GW 170-2)) may be referred to as a 'backhaul link'. The small base station 120-3 may provide communication services to the terminal 110-3 using a cellular communication protocol. The small base station 120-3 may be connected to the core network through the Xhaul network, and a link of (small base station 120-3-XDU 150-6-XDU 150-7-XDU 150-5-MME 170-1 (or, S-GW 170-2)) may be referred to as a 'backhaul link'.

The communication nodes (e.g., the terminal, the TRP, the macro base station, the small base station, the XDU, the XCU, the BBU block, the MME, the S-GW, and the P-GW) described above may be configured as follows.

Figure 3:
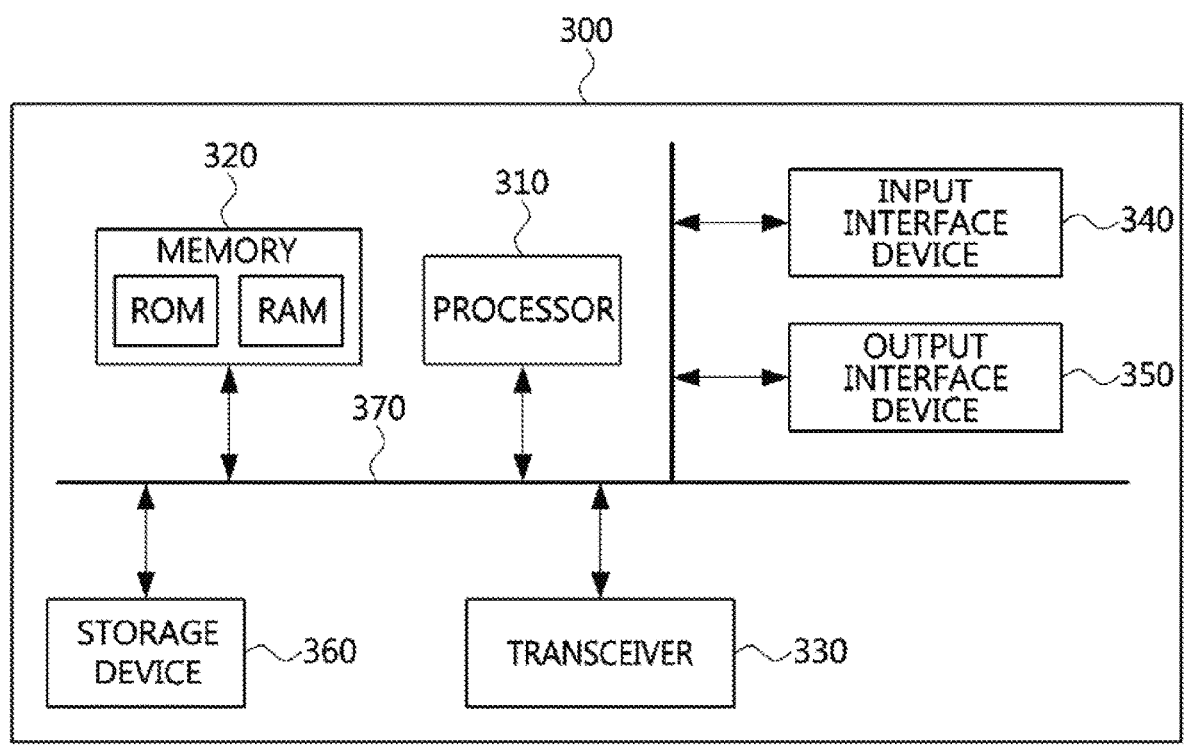
FIG. 3 is a block diagram illustrating a first embodiment of a communication node in a communication system.

FIG. 3 is a block diagram illustrating a first embodiment of a communication node in a communication system.

Referring to FIG. 3, a communication node 300 may comprise at least one processor 310, a memory 320, and a transceiver 330 connected to the network for performing communications. Also, the communication node 300 may further comprise an input interface device 340, an output interface device 350, a storage device 360, and the like. Each component included in the communication node 300 may communicate with each other as connected through a bus 370.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Figure 4:
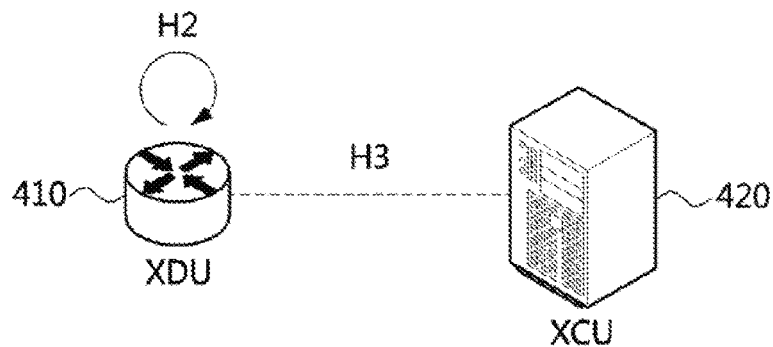
FIG. 4 is a conceptual diagram illustrating a first embodiment of an Xhaul network.

FIG. 4 is a conceptual diagram illustrating a first embodiment of an Xhaul network.

Referring to FIG. 4, an Xhaul network may include an XDU 410, an XCU 420, and the like. The XDU 410 may be connected to another XDU through an H2 interface. The XDU 410 may be connected to the XCU 420 through an H3 interface. The XDU 410 may transmit and receive data using a fronthaul link, a midhaul link, or a backhaul link in the Xhaul network. The midhaul link may be a link between a macro base station and a small base station. For example, the midhaul link may be a link between a first communication node supporting some functions of a packet data convergence protocol (PDCP) layer, a radio link control (RLC) layer, a medium access control (MAC) layer, and a physical (PHY) layer, and a second communication node supporting the remaining functions not supported by the first communication node.

A link between XDUs belonging to different Xhaul networks may not be formed. For example, a link between XDUs controlled by different XCUs may not be formed. The XDU 410 may be classified into a fixed XDU and a moving XDU. A place where the fixed XDU is installed may not be changed. The moving XDU may be installed in an entity having mobility (e.g., a vehicle, a train, a drone, etc.). A link between the moving XDUs may not be formed. In the Xhaul network, the XCU 420 may perform a topology management function, a transmission path management function, a control function for the XDU 410, and the like. There may be one XCU 420 in one Xhaul network.

The f-TRP may be used as a transmission and reception point for transmission and reception of a terminal, and may be connected to a communication node belonging to the Xhaul network through a fronthaul link or a midhaul link. A cloud platform may be connected to an XDU aggregator, and may be connected to the f-TRP through a fronthaul link or a midhaul link of the Xhaul network. The cloud platform may be connected to multiple f-TRPs. Functions of a base station (e.g., eNB) may be performed by the f-TRP and the cloud platform. Logically, a single cloud platform may exist in the communication system, and physically, multiple cloud platforms may exist in the communication system.

Meanwhile, each of the communication nodes (e.g., XDU, XCU) included in the Xhaul network may be composed of one or more sectors.

Figure 5:
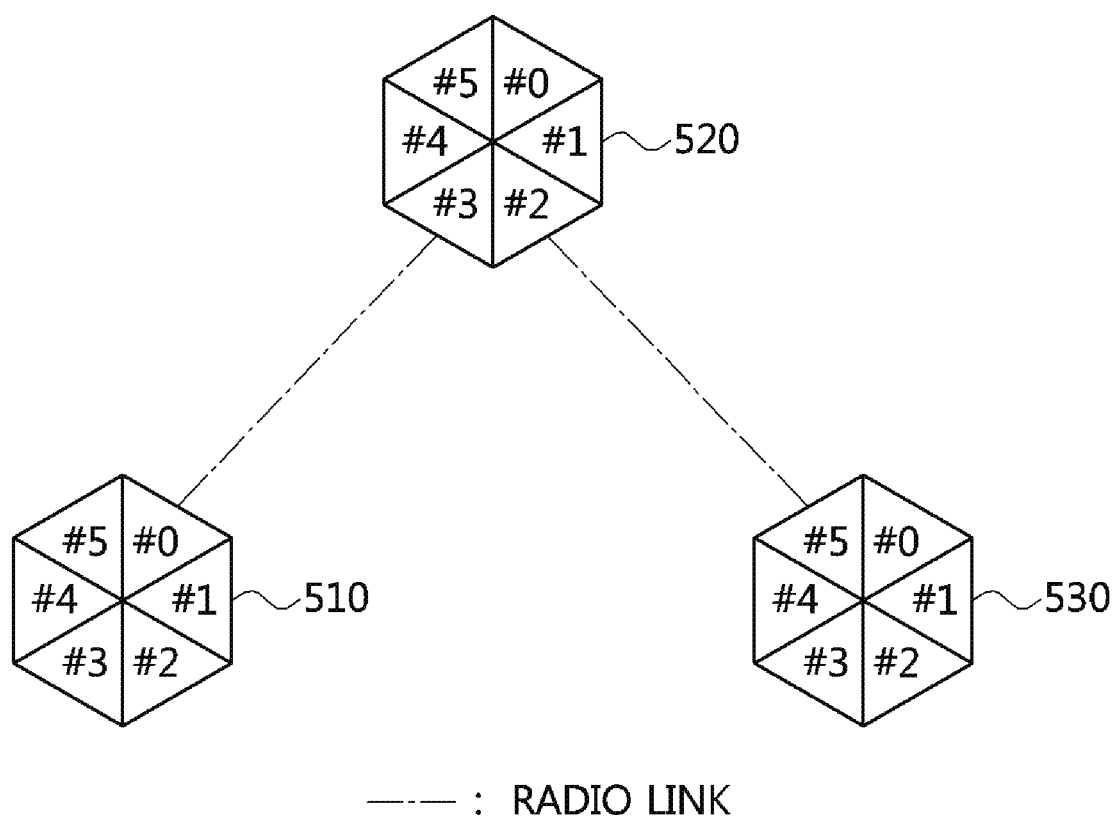
FIG. 5 is a conceptual diagram illustrating a first embodiment of a communication node configured with one or more sectors in an Xhaul network.

FIG. 5 is a conceptual diagram illustrating a first embodiment of a communication node configured with one or more sectors in an Xhaul network.

Referring to FIG. 5, each of the communication nodes 510, 520, and 530 may be an XDU or an XCU, and may be configured with 6 sectors (e.g., sectors #0 to #5).

Identifiers (IDs) of the sectors constituting the communication nodes 510, 520, and 530 may be configured. The sector ID may be configured as a combination of an ID of the communication node and an index of the corresponding sector. For example, when the ID of the communication node 510 is '1' and the indexes of the sectors constituting the communication node 510 are 'A' to 'F', the sector #0 of the communication node 510 may be set to '1A', the sector #1 of the communication node 510 may be set to '1B', the sector #2 of the communication node 510 may be set to '1C', the sector #3 of the communication node 510 may be set to '1D', the sector #4 of the communication node 510 may be set to '1E', and the sector #5 of the communication node 510 may be set to '1F'. The sector IDs of the communication nodes 520 and 530 may also be configured based on the scheme described above.

A radio link may be configured between the sectors of the communication node 510, 520, and 530. For example, the sector #0 of the communication node 510 may be connected to the sector #3 of the communication node 520 through a radio link, and the sector #2 of the communication node 520 may be connected to the sector #5 of the communication node 530 through a radio link. When the communication node 510 is an ingress XDU and the communication node 530 is an egress XDU, the sector #0 of the communication node 510 may transmit data to the sector #3 of the communication node 520, and the sector #3 of the communication node 520 may receive the data from the sector #0 of the communication node 510. In the communication node 520, the data may be forwarded from the sector #3 to the sector #2. The sector #2 of the communication node 520 may transmit the data to the sector #5 of the communication node 530, and the sector #5 of the communication node 530 may receive the data from the sector #2 of the communication node 520.

Meanwhile, when each of the communication nodes 510, 520, and 530 is an XDU, a protocol structure in the XDU #1 (i.e., communication node 510), the XDU #2 (i.e., communication node 520), and the XDU #3 (i.e., communication node 530) may be as follows.

Figure 6:
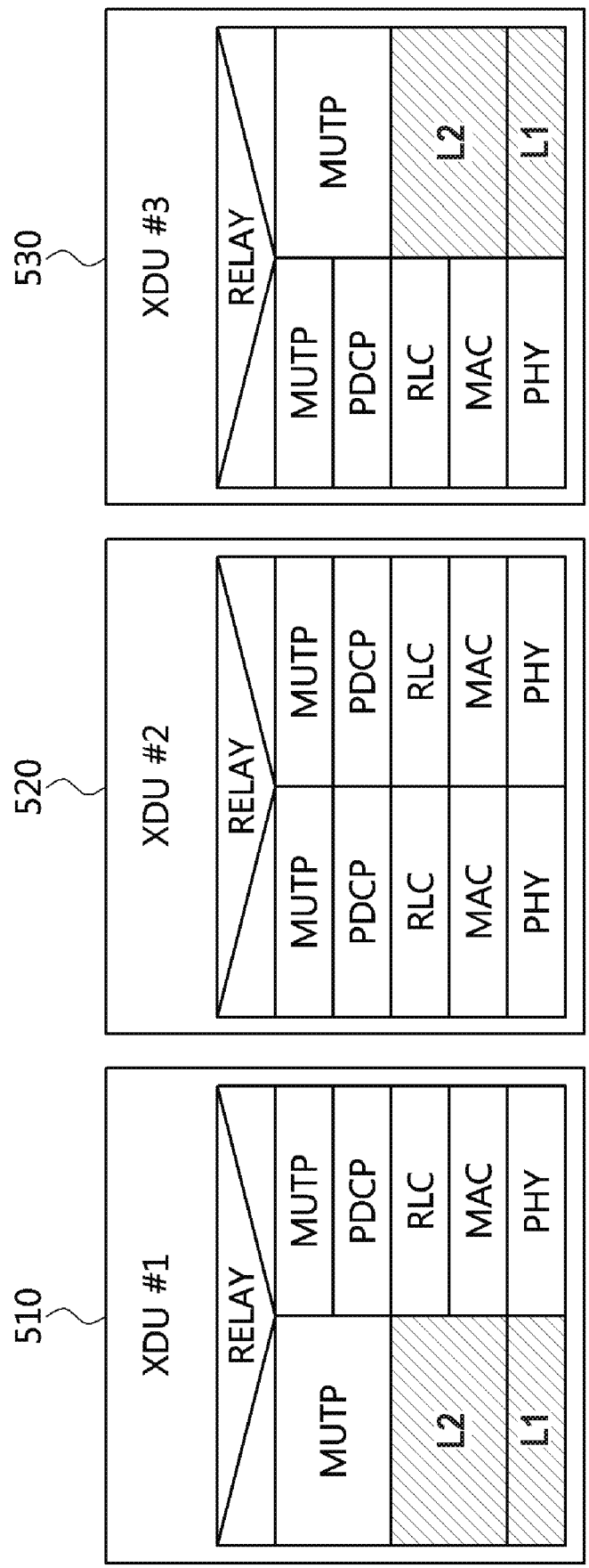
FIG. 6 is a block diagram illustrating a first embodiment of a protocol structure of a communication node in an Xhaul network.

FIG. 6 is a block diagram illustrating a first embodiment of a protocol structure of a communication node in an Xhaul network.

Referring to FIG. 6, a protocol structure (e.g., a user plane protocol structure) in the Xhaul network may further include a MUTP layer performing a function for data forwarding to an upper layer. The MUTP layer may perform packet encapsulation and decapsulation functions for making the Xhaul network interwork with an external network. Also, the MUTP layer may be a protocol for multi-hop based data forwarding functions in the Xhaul network.

For example, in the Xhaul network, the XDU 510 may have a protocol structure including an MUTP layer, an L2 layer, and an L1 layer. In addition, the XDU 510 may have a protocol structure including an MUTP layer, a PDCP layer, an RLC layer, a MAC layer, and a PHY layer for performing communications with the XDU 520. In addition, the XDU 520 may have a protocol structure including an MUTP layer, a PDCP layer, an RLC layer, a MAC layer, and a PHY layer for performing communications with the XDU 510 and the XDU 530. In addition, the XDU 530 may have a protocol structure including an MUTP layer, a PDCP layer, an RLC layer, an MAC layer, and a PHY layer for performing communications with the XDU 520. In addition, the XDU 530 may have a protocol structure including an MUTP layer, an L2 layer, and an L1 layer. In the Xhaul network, the structure of the user plane protocol may be a structure for supporting various external interfaces.

Figure 7A:
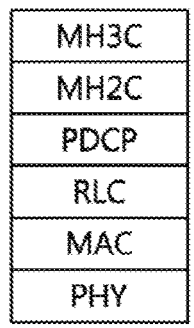
FIG. 7A is a block diagram illustrating a second embodiment of a protocol structure of a communication node in an Xhaul network.
Figure 7B:
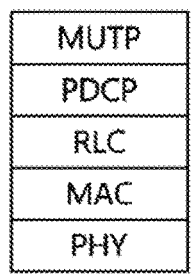
FIG. 7B is a block diagram illustrating a third embodiment of a protocol structure of a communication node in an Xhaul network.
Figure 7C:
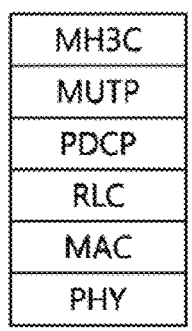
FIG. 7C is a block diagram illustrating a fourth embodiment of a protocol structure of a communication node in an Xhaul network.
Figure 7D:
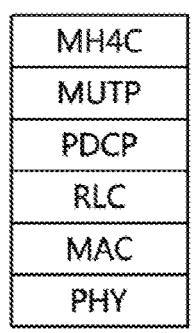
FIG. 7D is a block diagram illustrating a fifth embodiment of a protocol structure of a communication node in an Xhaul network.

FIG. 7A is a block diagram illustrating a second embodiment of a protocol structure of a communication node in an Xhaul network, FIG. 7B is a block diagram illustrating a third embodiment of a protocol structure of a communication node in an Xhaul network, FIG. 7C is a block diagram illustrating a fourth embodiment of a protocol structure of a communication node in an Xhaul network, and FIG. 7D is a block diagram illustrating a fifth embodiment of a protocol structure of a communication node in an Xhaul network.

Referring to FIGS. 7A to 7D, a communication node (e.g., a sector constituting the communication node) may basically include a PHY layer, a MAC layer, an RLC layer, and a PDCP layer, and may further include at least one of an MUTP layer, an MXN H2 control (MH2C) layer, an MXN H3 control (MH3C) layer, and an MXN H4 control (MH4C) layer. In FIG. 7A, a communication node may have a protocol structure including a PHY layer, a MAC layer, an RLC layer, a PDCP layer, an MH2C layer, and an MH3C layer. In FIG. 7B, a communication node may have a protocol structure including a PHY layer, a MAC layer, an RLC layer, a PDCP layer, and an MUTP layer. In FIG. 7C, a communication node may have a protocol structure including a PHY layer, a MAC layer, an RLC layer, a PDCP layer, an MUTP layer, and an MH3C layer. In FIG. 7D, a communication node may have a protocol structure including a PHY layer, a MAC layer, an RLC layer, a PDCP layer, an MUTP layer, and an MH4C layer.

Meanwhile, messages used in the Xhaul network may be classified into messages related to a path management and messages related to a traffic transfer. The path management related messages may include a backup path activation message and the like. The path management related messages may be transmitted in a hop-by-hop scheme. The traffic transfer related messages may include a sequence number (SN) status transfer or report message, an end marker message, and the like. The traffic transfer related messages may be transmitted in a hop-by-hop scheme or a multi-hop scheme.

A protocol used for transmission and reception of the path management related messages may be distinguished from a protocol used for transmission and reception of the traffic transfer related messages. For example, the XDU may transmit and receive a path management related message to and from another XDU using the protocol structure shown in FIG. 7C. Alternatively, the XDU may transmit and receive a path management related message to and from another XDU using the protocol structure shown in FIG. 7D. In the Xhaul network, a transmission path of a message (e.g., a path management related message) may be preconfigured. A path for a message transmitted in the multi-hop scheme (e.g., handover related message) may also be preconfigured between XDUs.

The traffic transfer related message may be defined as a control message of the MUTP. For example, the traffic transfer related message may include an MUTP protocol header, and the MUTP protocol header of the traffic transfer related message may include a control/data type field. A flow identifier (ID) (e.g., a control flow ID) for a traffic transfer related message transmitted in a single hop scheme may be defined. For example, the traffic transfer related message transmitted in the single hop scheme may include a message type, a flow ID, SN information (e.g., SN information for the SN status transfer and reporting), and the like. For example, the flow ID may indicate a traffic having same quality of service (QoS) class and same path. Alternatively, the flow ID may be defined according to other field (e.g., traffic class identifier). A path of the traffic transfer related message transmitted in the single hop scheme may be preconfigured. When a traffic transfer related message is transmitted in the multi-hop scheme, a path of the traffic transfer related message may be configured by a backup path activation message.

Meanwhile, a scheme for interworking with a lower layer may be considered to support an SN status (e.g., SN status of the MUTP) exchange function. For example, a traffic forwarding function may be defined to prevent data loss when a path change due to a loss of a radio link is performed. If a recovered path is configured with multi-hops, or if flows belonging to the same radio access bearer (RAB) are recovered to different paths, the exchange of the SN status of the MUTP may be required. Also, MUTP SN for the transmitted data and MUTP SN for the received data may be required. The traffic forwarding may be required in a radio link control unacknowledged mode (RLC-UM) as well as a radio link control acknowledged mode (RLC-AM) for improving transmission reliability in the communication system (e.g., Xhaul network).

Accordingly, a transmission operation for supporting the exchange function of the SN status (e.g., the SN status of the MUTP) may be performed as follows.

Flow identifiers (IDs) having the same priority may be mapped to one radio bearer.

It may be necessary to manage mapping relationship between SNs per flow ID and SNs per radio bearer. For example, the mapping relationship between the SNs per flow ID and the SNs per radio bearer may be managed by the MUTP layer.

The PDCP layer may inform the MUTP layer of an SN for a radio bearer identifier (RBID) whose transmission is completed. For example, the PDCP layer may inform the MUTP layer that a PDCP service data unit (SDU) has been successfully transmitted through a radio link. In the case that the RLC-AM is used, when an ACK indicating that all protocol data units (PDUs) belonging to one RLC SDU have been successfully received is received from a receiving end, the PDCP lay may transfer the received ACK to the upper layer (e.g., MUTP layer). In the case that RLC-UM is used, when all PDUs belonging to one RLC SDU have been successfully transmitted, the PDCP layer may inform the upper layer (e.g., MUTP layer) that the RLC SDU has been successfully transmitted. The data having an MUTP SN corresponding to an SN of the successfully-transmitted RBID may be deleted from a transmission buffer. The data remaining in the transmission buffer may be used for retransmission due to a path recovery in the future.

A reception operation for supporting the exchange function of the SN status (e.g., the SN status of the MUTP) may be performed as follows The PDCP layer may transmit PDUs reordered for each RBID to the MUTP layer.

The MUTP layer may perform packet reordering for each flow ID.

Meanwhile, data of an ingress XDU in the Xhaul network may be transmitted as follows.

Figure 8:
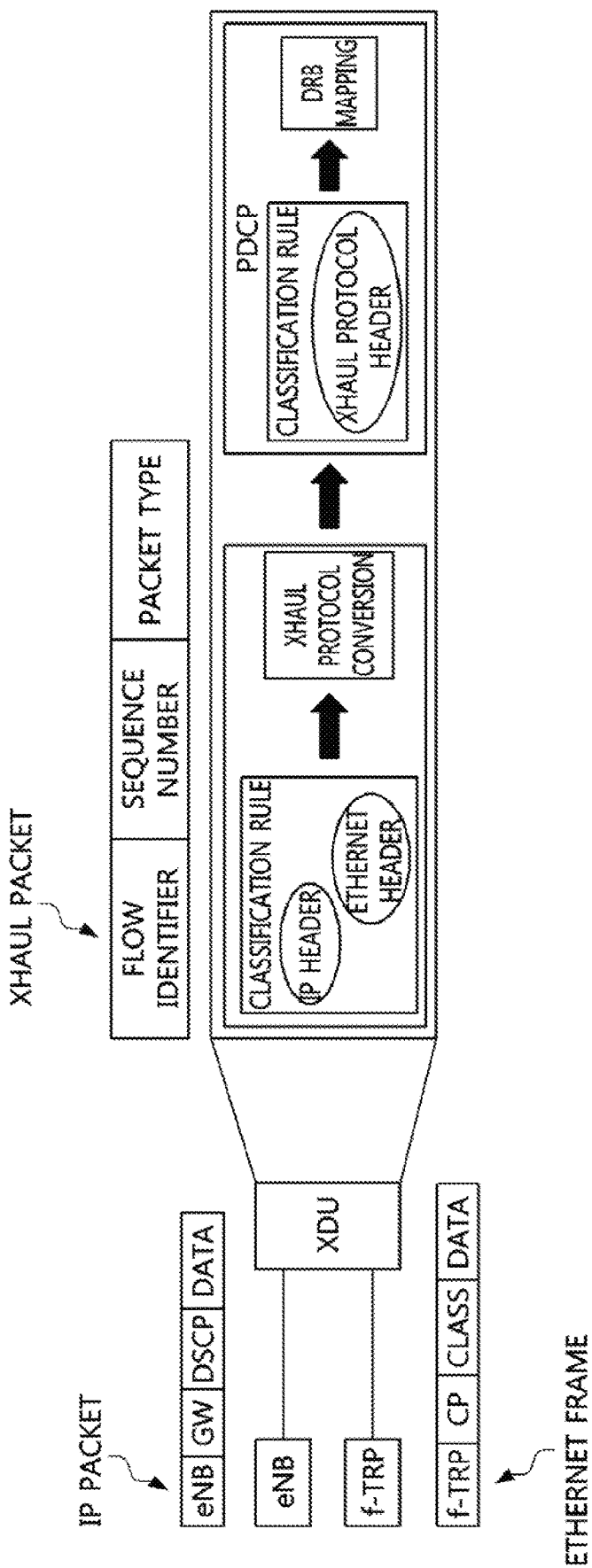
FIG. 8 is a conceptual diagram illustrating a first embodiment of a data transmission procedure of an ingress XDU.

FIG. 8 is a conceptual diagram illustrating a first embodiment of a data transmission procedure of an ingress XDU.

The following fields may be defined in an integrated transport protocol of an Xhaul network based on a flow separator (e.g., a flow ID).

Flow identifier: MXN forwarding bearer identifier

Sequence number: supports a packet ordering function for split bearers and duplicated bearers Packet type: supports various operator environments and transmission of various packet types In an integrated transport protocol of an Xhaul network based on a sector identifier (ID), an identifier for a forwarding bearer between an ingress XDU and an egress XDU may be set to a source sector ID or a destination sector ID.

Alternatively, an identifier for a forwarding bearer between an ingress XDU and an egress XDU may be set to a flow ID.

In the integrated transport protocol of Xhaul network, fields may be defined as follows.

Source sector ID field: Ingress XDU sector address
    Destination sector ID field: Egress XDU sector address
    Traffic class identifier field
    Operator identifier field: Quality of Service (QoS) for each operator, priories between operators
    Sequence number (SN) field: supports reordering for split bearers and duplicated bearers Referring to FIG. 8, a source sector ID, a destination sector ID, a QoS class, and an Xhaul protocol header may be determined according to a classification rule based on an internet protocol (IP) header or an Ethernet header. The IP header may include a source IP address, a destination IP address, and a differentiated services code point (DSCP), and the Ethernet header may include a source Ethernet address, a destination Ethernet address, and a QoS field. When there is a target sector ID corresponding to the source sector ID, the destination sector ID, or the QoS class of the Xhaul protocol header in the forwarding table, a radio bearer according to the source sector ID, the destination sector ID, or the QoS class may be mapped.

The XDU sector receiving the Xhaul data packet may transmit the Xhaul data packet to the target sector by referring to the forwarding table when the destination sector ID of the Xhaul data packet is not the ID of itself.

When the identifier for the forwarding bearer between the ingress XDU and the egress XDU is defined as a flow ID, the flow ID and the Xhaul protocol header may be determined according to the classification rule based on an IP header or an Ethernet header. The IP header may include a source IP address, a destination IP address, and a DSCP, and the Ethernet header may include a source Ethernet address, a destination Ethernet address, and a QoS field. If there is a target sector ID corresponding to the flow ID of the Xhaul protocol header in the forwarding table, the Xhaul data packet may be transmitted to the target sector. In this case, flows having the same target sector may be transmitted as mapped to the same radio bearer when QoS requirements are satisfied.

An XDU sector supporting a redundant transmission function may generate redundant Xhaul data packets and may transmit the redundant Xhaul data packets to another sector in the XDU. An XDU sector supporting a redundant reception function may perform a reordering operation on the Xhaul data packets. An XDU sector supporting a bearer split function may transmit the Xhaul data packet to another sector in the XDU. The classification rule and the forwarding table may be configured by the path management message. In FIG. 8, the Flow ID-based Xhaul network integrated transport protocol may define a flow ID instead of the source sector ID and the destination sector ID.

Next, methods for configuring or changing a path between communication nodes in a communication system (e.g., Xhaul networks shown in FIG. 1 or 2) will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. For example, when an operation of an XDU is described, a corresponding XCU may perform an operation corresponding to the operation of the XDU. Conversely, when an operation of the XCU is described, the corresponding XDU may perform an operation corresponding to the operation of the XCU.

Also, in the embodiments described below, the 'Xhaul' may refer to an Xhaul network or an Xhaul link, the 'fronthaul' may refer to a 'fronthaul network' or a 'fronthaul link', the 'midhaul' may refer to a 'midhaul network' or a 'midhaul link', and the 'backhaul' may refer to a 'backhaul network' or a 'backhaul link'.

Meanwhile, when an XDU is added or removed, a handover between the XDUs is performed, a load balancing between the XDUs is required, or a change of an original path is required according to a radio link state of the XDU, a change of an original path may be required. In this case, the original path may be changed to a new path. For example, according to movement of a moving XDU as described below, a handover may be required.

FIG. 9 is a conceptual diagram illustrating a first embodiment of a path change method according to a handover in an Xhaul network.

Referring to FIG. 9, an Xhaul network may include an XDU 910, an XDU 920, an XDU 930, an XDU 940, and the like. Each of the XDU 910, the XDU 920 and the XDU 930 may be a fixed XDU, and the XDU 940 may be a moving XDU. In the Xhaul network, an original path may be a path of (XDU 910-XDU 930-XDU 940). In this case, a path (e.g., a radio link) of (XDU 910-XDU 930) belonging to the original path may be configured, and a path (e.g., a radio link) of (XDU 930-XDU 940) belonging to the original path may also be configured.

According to movement of the XDU 940 (e.g., from the XDU 930 to the XDU 920), a radio link state between the XDU 930 and the XDU 940 may be degraded. For example, when a radio link state between the XDU 930 and the XDU 940 is worse than a radio link state between the XDU 920 and the XDU 940, a handover for the XDU 940 may be performed. The handover between XDUs may be controlled by the XCU. When the handover is performed, the radio link between the XDU 930 and the XDU 940 may be released, and a radio link between the XDU 920 and the XDU 940 may be newly configured.

The XDU 930 participating in the handover may be referred to as an active XDU and the XDU 920 participating in the handover may be referred to as a target XDU. When the handover is completed, the path of (XDU 910-XDU 930-XDU 940) may be changed to a path of (XDU 910-XDU 930-XDU 920-XDU 940) or a path of (XDU 910-XDU 920-XDU 940). The handover (e.g., path change procedure) for the moving XDU (e.g., the XDU 940) may be performed as follows.

FIG. 10A is a sequence chart illustrating a first embodiment of a path change method according to a handover in an Xhaul network, FIG. 10B is a sequence chart illustrating a first embodiment of a communication method in the changed path, and FIG. 10C is a sequence chart illustrating a second embodiment of a communication method in the changed path.

Referring to FIGS. 10A to 10C, an Xhaul network may include an XDU #1, an XDU #2, an XDU #3, an XDU #4, an XCU, a network entity, and the like. The network entity may be a communication node belonging to the access network or the core network shown in each of FIGS. 1 and 2. Each of the XDU #1, the XDU #2, the XDU #3, the XDU #4, the XCU, and the network entity may be configured identically to or similarly to the communication node 200 shown in FIG. 2, and may support the protocol structures shown in FIG. 6 and FIGS. 7A to 7D. Also, each of the XDU

1, the XDU #2, the XDU #3, and the XDU #4 may comprise a plurality of sectors identically to or similarly to the communication nodes 510, 520 and 530 shown in FIG. 5.

The XDU #1, the XDU #2, the XDU #3, and the XDU #4 may be the XDU 910, the XDU 920, the XDU 930, and the XDU 940 shown in FIG. 9. That is, the XDU #1, the XDU #2, and the XDU #3 may be fixed XDUs, and the XDU 940 may be a moving XDU. The deployment structure of the XDU #1, the XDU #2, the XDU #3, and the XDU #4 may be the same as the deployment structure of the XDU 910, the XDU 920, the XDU 930, and the XDU 940, which is shown in FIG. 9.

The XDU #4 may perform communication using a path of (XDU #1-XDU #3-XDU #4), and when a radio link state of (XDU #3-XDU #4) is degraded according to movement of the XDU #4, a handover for the XDU #4 may be required. In this case, the XCU may determine the handover for the XDU #4 to be performed, and transmit a message requesting to change a path (e.g., a path setup request message or a path change request message) to each of the XDU #1, the XDU #2, the XDU #3, and the XDU #4. The path setup request message may indicate that the path of (XDU #1-XDU #3-XDU #4) is to be changed to a path of (XDU #1-XDU #3-XDU #2-XDU #4) or a path of (XDU #1-XDU #2-XDU #4). Here, the XDU #3 may be an active XDU, and the XDU #2 may be a target XDU. Also, the path setup request message may include configuration information of the new path (e.g., identifiers (e.g., XDU IDs, sector IDs, sector indexes) of XDUs constituting the new path, a flow ID for the new path, or the like).

Upon receipt of the path setup request message from the XCU, each of the XDU #1, the XDU #2, the XDU #3, and the XDU #4 may perform the handover based on the information included in the path setup request message. For example, the XDU #3 may generate an SN status transfer message (or, SN status report message) including a SN for data (e.g., traffic) stored in a buffer (e.g., a transmission buffer or a reception buffer), and may transmit the SN status transfer message to the XDU #2 which is the target XDU (S1001). In order to reduce a transmission delay of the SN status transfer message, the SN status transfer message may be transmitted through a control path of (XDU #3-XDU #2) using a control flow ID without the control of the XCU. The control path of (XDU #3-XDU #2) and the control flow ID may be preconfigured by the XCU. The SN status transfer message may be used for an unacknowledged mode (UM) bearer as well as an acknowledged mode (AM) bearer.

The SN status transfer message may include an SN of received data. Alternatively, when a transmission path is the same as a reception path, the SN status transfer message may include an SN of transmitted data as well as the SN of the received data. When the SN of the received data and the SN of the transmitted data are transmitted to the XDU #2, the XDU #2 may efficiently perform a data retransmission procedure based on the SN of the received data and the SN of the transmitted data.

The SN included in the SN status transfer message may be a PDCP SN or an MUTP SN. The PDCP SN may be transmitted through the SN status transfer message when it is necessary to maintain configuration of L2 entities to reduce a configuration delay of the radio link (e.g., when PDCP SN maintenance is required in the cellular communication system). When the radio link (e.g., path) between the XDU #4 and the XDU #3 is released, the radio link between the XDU #4 and the XDU #2 is configured, and the connection of the sector (e.g., sector #0) of the XDU #4 is maintained, the status of the PDCP SN between the XDU #4 and the XDU #2 may be maintained, thereby reducing the radio link configuration delay. However, when the radio link (e.g., path) between the XDU #4 and the XDU #3 is released and the radio link between the XDU #4 and the XDU #2 is configured, a sector (e.g., sector #0) of the XDU #4, which is connected to the XDU #3, may be different from a sector (e.g., sector #5) of the XDU #4, which is connected to the XDU #2. That is, when the sector of the XDU #4 is changed, since all the transmitting and receiving sectors are changed, the necessity of maintaining the PDCP SN may be low. In this case, the MUTP SN may be transmitted through the SN status transfer message. Also, it may be preferable that the MUTP SN is transmitted through the SN status transfer message in other path change scenarios (e.g., the multi-hop recovery scenario, the scenario in which flows belonging to the same RAB are recovered to different paths).

The XDU #2 may receive the SN status transfer message from the XDU #3, and may identify the SN included in the SN status transfer message. When the transmission of the SN status transfer message is completed, the XDU #3 may transmit the data corresponding to the SN included in the SN status transfer message to the XDU #2 (S1002). When a PDCP SN is transmitted through the SN status transfer message, the PDCP data (e.g., PDCP SDU) may be transmitted from the XDU #3 to the XDU #2 in the step S1002. In this case, the PDCP data may be transmitted through an MUTP tunnel. Alternatively, when an MUTP SN is transmitted through the SN status transfer message, the MUTP data (e.g., MUTP packet) may be transmitted from the XDU #3 to the XDU #2 in the step S1002.

Meanwhile, when the path of (XDU #1-XDU #3-XDU #4) is changed to the path of (XDU #1-XDU #3-XDU #2-XDU #4) or the path of (XDU #1-XDU #2-XDU #4), a procedure of configuring a radio link (e.g., a path) between the XDU #2 and the XDU #4 may be performed (S1003). In the step S1003, a link configuration request message (e.g., path setup request message), a link configuration response message (e.g., path setup response message), a handover command message, a handover complete message, and the like are exchanged, so that a radio link between the XDU #2 and the XDU #4 may be configured. The message exchanged in the step S1003 may include a flow ID.

When the configuration of the radio link between the XDU #2 and the XDU #4 is completed, the XDU #4 may transmit to the XCU a link change indication message (e.g., path change indication message) indicating that the XDU #4 is connected to a new XDU (e.g., the XDU #2) (S1004). The XCU may receive the link change indication message from the XDU #4, and confirm that the XDU #4 is connected to the XDU #2 based on the received link change indication message. Also, the XCU may configure an optimal path based on the information included in the link change indication message. For example, when the path of (XDU #1-XDU #3-XDU #2-XDU #4) is configured according to the handover, the XCU may change the path of (XDU #1-XDU #3-XDU #2-XDU #4) to the path of (XDU #1-XDU #2-XDU #4) which is the optimal path. The XCU may transmit configuration information of the optimal path to each of the XDU #1, the XDU #2, the XDU #3, and the XDU #4.

Also, when the configuration of the radio link between the XDU #2 and the XDU #4 is completed, the XDU #2 may transmit the data received from the XDU #3 in the step S1002 to the XDU #4 (S1005). In the step S1005, the data may be transmitted to the XDU #4 together with the SN. Also, the XDU #2 may transmit to the XDU #4 an end marker message indicating that the data transmitted in the step S1005 is the last data of the original path (i.e., the path of (XDU #1-XDU #3-XDU #4)). That is, the end marker message may indicate that there is no data of the original path in the buffer of the XDU #2. The XDU #4 may receive the data of the original path from the XDU #2 in the step S1005, and may determine that the data is the last data of the original path when confirming the end marker message.

Communication Method in the Path of (XDU #1-XDU #3-XDU #2-XDU #4)

Meanwhile, after the path of (XDU #1-XDU #3-XDU #4) is changed to the path of (XDU #1-XDU #3-XDU #2-XDU #4), the data may be transmitted through the path of (XDU #1-XDU #3-XDU #2-XDU #4). For example, the network entity may transmit data to the XDU #1 (S1006). The XDU #1 may receive the data from the network entity, and transmit the data to the XDU #3 belonging to the new path (S1007). The XDU #3 may receive the data from the XDU #1, and transmit the data to the XDU #2 belonging to the new path (S1008). The XDU #2 may receive the data from the XDU #3, and transmit the data to the XDU #4 belonging to the new path (S1009). Also, when the XDU #2 supports a reordering function, the XDU #2 may perform reordering on the data received in the step S1002 and the data received in the step S1008 based on the corresponding SNs, and transmit the reordered data to the XDU #4. In this case, the end marker message may not be transmitted to the XDU #4.

The XDU #4 may receive the data of the new path from the XDU #2. Also, the XDU #4 may identify the SN of the data of the original path received in the step S1005 and the SN of the data of the new path received in the step S1009, and transmit to the XDU #2 an SN status report message (e.g., SN status transfer message) indicating an SN required to be retransmitted (S1010). The XDU #2 may receive the SN status report message from the XDU #4, identify the data required to be retransmitted based on the SN status report message, and retransmit the identified data to the XDU #4.

Communication Method in the Path of (XDU #1-XDU #2-XDU #4)

Meanwhile, after the path of (XDU #1-XDU #3-XDU #4) is changed to the path of (XDU #1-XDU #2-XDU #4), the data may be transmitted through the path of (XDU #1-XDU #2-XDU #4). For example, the network entity may transmit data to the XDU #1 (S1011). The XDU #1 may receive the data from the network entity, and transmit the data to the XDU #2 belonging to the new path (S1012). The XDU #2 may receive the data from the XDU #1, and transmit the data to the XDU #4 belonging to the new path (S1013). Also, when the XDU #2 supports a reordering function, the XDU #2 may perform reordering on the data received in the step S1002 and the data received in the step S1012 based on the corresponding SNs, and transmit the reordered data to the XDU #4. In this case, the end marker message may not be transmitted to the XDU #4.

The XDU #4 may receive the data of the new path from the XDU #2. Also, the XDU #4 may identify the SN of the data of the original path received in the step S1005 and the SN of the data of the new path received in the step S1013, and transmit to the XDU #2 an SN status report message (e.g., SN status transfer message) indicating an SN required to be retransmitted (S1014). The XDU #2 may receive the SN status report message from the XDU #4, identify the data required to be retransmitted based on the SN status report message, and retransmit the identified data to the XDU #4.

Next, a path change procedure by the XCU will be described.

Figure 11:
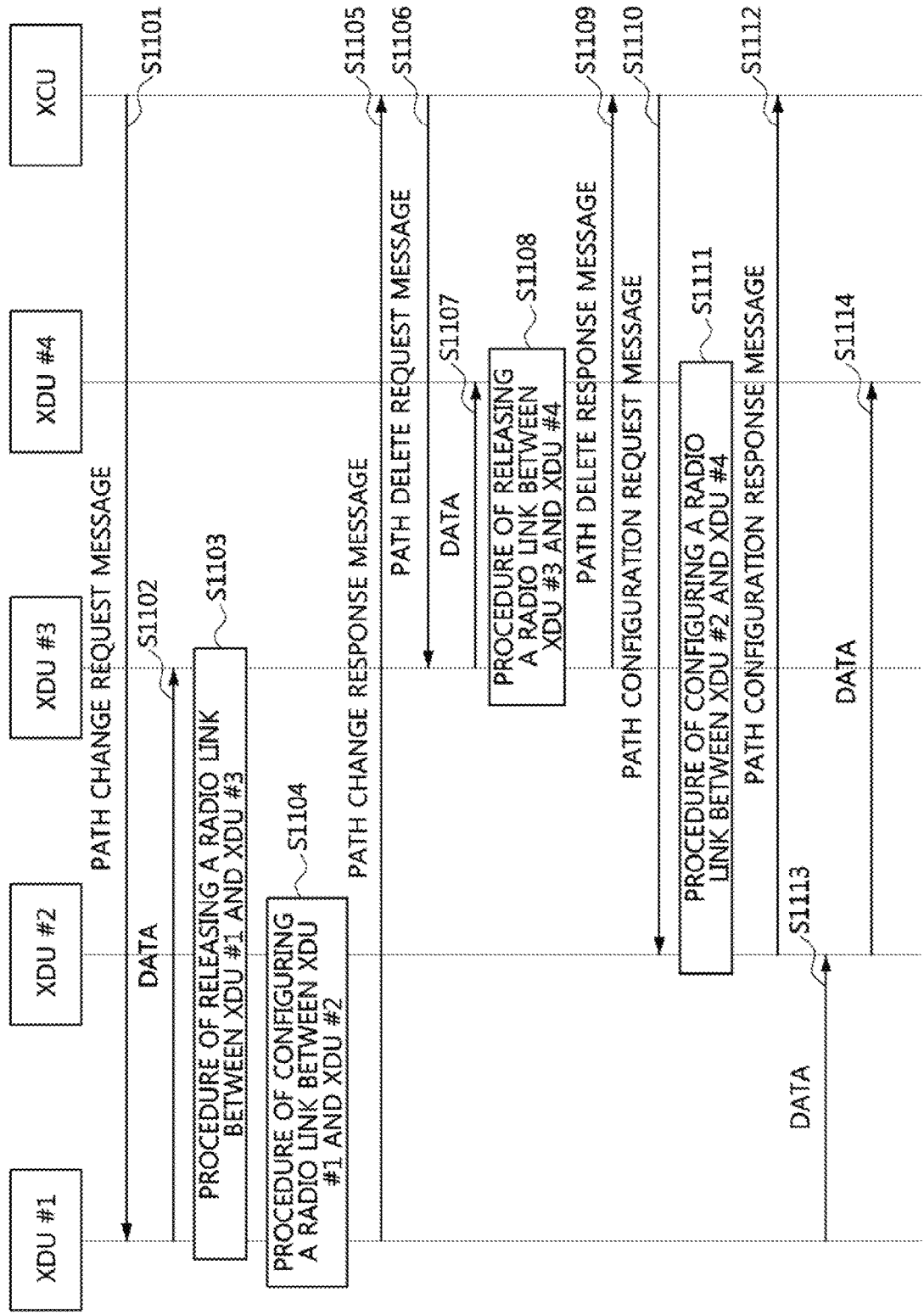
FIG. 11 is a sequence chart illustrating a first embodiment of a path changing method by an XCU in an Xhaul network.

FIG. 11 is a sequence chart illustrating a first embodiment of a path changing method by an XCU in an Xhaul network.

Referring to FIG. 11, an Xhaul network may include an XDU #1, an XDU #2, an XDU #3, an XDU #4, an XCU, and the like. Each of the XDU #1, the XDU #2, the XDU #3, the XDU #4, and the XCU may be configured identically to or similarly to the communication node 200 shown in FIG. 2, and may support the protocol structures shown in FIG. 6 and FIGS. 7A to 7D. Also, each of the XDU #1, the XDU #2, the XDU #3, and the XDU #4 may comprise a plurality of sectors identically to or similarly to the communication nodes 510, 520 and 530 shown in FIG. 5.

The XDU #1, the XDU #2, the XDU #3, and the XDU #4 may be the XDU 910, the XDU 920, the XDU 930, and the XDU 940 shown in FIG. 9. That is, the deployment structure of the XDU #1, the XDU #2, the XDU #3, and the XDU #4 may be the same as the deployment structure of the XDU 910, the XDU 920, the XDU 930, and the XDU 940, which is shown in FIG. 9. Each of the XDU #1, the XDU #2, the XDU #3, and the XDU #4 may be a fixed XDU.

Each of the XDU #1, the XDU #2, the XDU #3, and the XDU #4 may report to the XCU information on a radio link state, the amount of used radio resources, information indicating whether a topology is changed or not, and the like. Based on the information (e.g., the radio link state information, the amount of used radio resources, and the information indicating whether a topology is changed or not) received from the XDU #1, the XDU #2, the XDU #3, and the XDU #4, the XCU may determine an optimal path, and may change the original path to the optimal path (i.e., new path). When the original path is (XDU #1-XDU #3-XDU #4) route and the new route is (XDU #1-XDU #2-XDU #4), the path change procedure may be performed as follows.

Among the XDUs constituting the Xhaul network, an XDU located at a point where the original path and the new path are separated may be referred to as a 'disjoint XDU'. Here, the disjoint XDU may be the XDU #1. Also, among the XDUs constituting the Xhaul network, an XDU located at a point where the original path and the new path match may referred to as a 'joint XDU'. Here, the joint XDU may be the XDU #4. The joint XDU and the disjoint XDU may be determined based on the following two schemes.

■ Joint/Disjoint XDU Determination Scheme #1

The XCU may transmit a message (e.g., path setup request message) including an identifier of an XDU corresponding to a joint XDU (e.g., ID of the XDU #4), an identifier of an XDU corresponding to a disjoint XDU (e.g., ID of the XDU #1), and the like. The XDUs receiving the corresponding message may identify the joint XDU (e.g., the XDU #4) and the disjoint XDU (e.g., the XDU #1). Each of the joint XDU and the disjoint XDU may be configured for each flow ID.

■ Joint/Disjoint XDU Determination Scheme #2

The XDUs constituting the Xhaul network may directly identify the joint XDU (e.g., the XDU #4) and the disjoint XDU (e.g., the XDU #1) based on the path configured for each flow ID. For example, an XDU (e.g., the XDU #1) receiving a message instructing to delete an original path and add a new path for the same flow ID may determine that itself is the disjoint XDU for the corresponding flow ID. An XDU (e.g., the XDU #4) corresponding to a final destination of a path may determine that itself is the joint XDU. An XDU (e.g., the XDU #4) that transmits data received from different sectors through one sector may determine that itself is the joint XDU.

Meanwhile, in the path change procedure by the XCU, the XCU may transmit to the XDU #1, which is the disjoint XDU, a path change request message requesting to delete (e.g., release) the original path (e.g., the path of (XDU #1-XDU #3)) and add the new path (e.g., path of (XDU #1-XDU #2)) (S1101). The path change request message may include identifiers of the XDUs constituting the new path, a flow ID of the new path, and the like. The XDU #1 may receive the path change request message from the XCU, and identify that the deletion of the original path and the addition of the new path are requested based on the path change request message. In this case, the XDU #1 may transmit all the data stored in a buffer to the XDU #3 belonging to the original path (S1102). However, since segmented data, retransmission data (e.g., retransmission PDU), and the like among the data stored in the buffer (e.g., RLC buffer) of the XDU #1 can be transmitted through the new path instead of the original path, the XDU #1 may transmit to the XDU #3 belonging to the original path data other than the data to be transmitted through the new path among the data stored in the buffer.

In the step S1102, the XDU #1 may transmit to the XDU #3 an end marker message indicating the last data of the original path. That is, the end marker message may indicate that there is no data of the original path in the buffer of XDU #1. When the XDU #4 that is the joint XDU supports a reordering function, the XDU #1 may not transmit the end marker message to the XDU #3 in the step S1102. The XDU #3 may receive the data from the XDU #1. Also, when the end marker message is received from the XDU #1, the XDU #3 may determine that the data received from the XDU #1 is the last data of the original path.

After the step S1102 is completed, the XDU #1 may perform a procedure of releasing the radio link between the XDU #1 and the XDU #3 (S1103). When the step S1103 is completed, the radio link between the XDU #1 and the XDU #3 may be released. However, when another traffic flow (e.g., a traffic flow having a flow ID different from the flow ID indicated by the path change request message) is configured in radio link between the XDU #1 and the XDU #3, the XDU #1 may not perform the procedure of releasing the radio link between the XDU #1 and the XDU #3.

Also, the XDU #1 may perform a procedure of configuring the radio link between the XDU #1 and the XDU #2 (S1104). When the step S1104 is completed, the radio link between the XDU #1 and the XDU #2 may be configured. When the deletion of the original path and the addition of the new path are completed, the XDU #1 may transmit to the XCU a path change response message indicating that the deletion of the original path and the addition of the new path are completed (S1105). Upon receiving the path change response message from the XDU #1, the XCU may determine that the deletion of the original path and the addition of the new path are completed in the XDU #1.

The XCU may transmit a path delete request message (e.g., a path release request message) to the XDU #3 that does not constitute the new path (S1106). The XDU #3 may receive the path delete request message from the XCU, and may determine that the deletion of the radio link between the XDU #3 and the XDU #4 is requested based on the path delete request message. In this case, the XDU #3 may transmit all the data stored in a buffer to the XDU #4 belonging to the original path (S1107). In the step S1107, the XDU #3 may transmit to the XDU #4 an end marker message indicating that the data is the last data of the original path. When the XDU #4 that is the joint XDU supports a reordering function, the XDU #3 may not transmit the end marker message to the XDU #4 in the step S1107. The XDU #4 may receive the data from the XDU #3.

Also, upon receiving the end marker message from the XDU #3, the XDU #4 may determine that the data received from the XDU #3 is the last data of the original path.

After the step S1107 is completed, the XDU #3 may perform a procedure of releasing the radio link between the XDU #3 and the XDU #4 (S1108). When the step S1108 is completed, the radio link between the XDU #3 and the XDU #4 may be released. However, when another traffic flow (e.g., a traffic flow having a flow ID different from the flow ID indicated by the path delete request message) is configured in radio link between the XDU #3 and the XDU #4, the XDU #3 may not perform the procedure of releasing the radio link between the XDU #3 and the XDU #4. When the deletion of the original path is completed, the XDU #3 may transmit to the XCU a path delete response message indicating that the deletion of the original path is completed (S1109). Upon receiving the path delete response message from the XDU #3, the XCU may determine that the deletion of the original path is completed in the XDU #3.

The XCU may transmit a path setup request message to the XDU #2 constituting the new path (S1110). The path setup request message may include identifiers of the XDUs constituting the new path, a flow ID, and the like. The XDU #2 may receive the path setup request message from the XCU, and may determine that the configuration of the radio link between the XDU #2 and the XDU #4 is requested based on the path setup request message. Accordingly, the XDU #2 may perform a procedure of configuring the radio link between the XDU #2 and the XDU #4 (S1111). When the configuration of the radio link between the XDU #2 and the XDU #4 is completed, the XDU #2 may transmit to the XCU a path setup response message indicating that the configuration of the new path is completed (S1112). Upon receiving the path setup response message from the XDU #2, the XCU may determine that the configuration of the new path is completed in the XDU #2.

When the configuration of the new path of (XDU #1-XDU #2-XDU #4) is completed, the XDU #1 may transmit data to the XDU #2 belonging to the new path (S1113). The XDU #2 may receive the data from the XDU #1, and may transmit the received data to the XDU #4 belonging to the new path (S1114). The XDU #4 may receive the data from the XDU #2. The XDU #4 may perform reordering on the data received in the step S1107 and the data received in the step S1114 based on the SNs. Thereafter, the XDU #4 may transmit the data to another XDU or to a communication node belonging to another network (e.g., access network, core network).

Meanwhile, in the Xhaul network, the path change procedure may be performed by the XDU without the control of the XCU. For example, a backup path for an original path may be preconfigured by the XCU, and the XDU may change the original path to the backup path when a specific event (e.g., a loss of a radio link, radio link failure, a traffic congestion degree equal to or greater than a threshold) occurs. When the original path is (XDU #1-XDU #3-XDU #4), the backup paths configured by the XCU may be as follows.

Figure 12A:
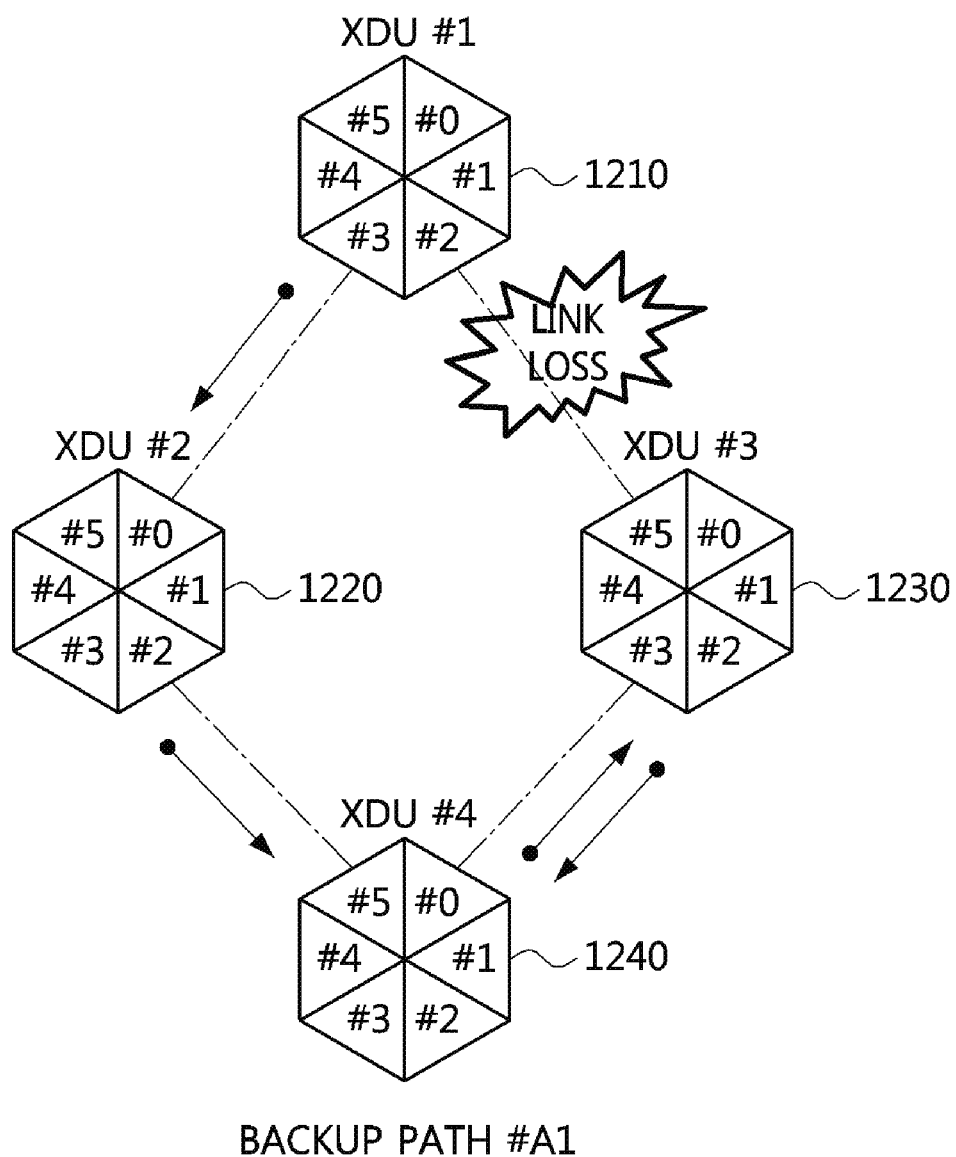
FIG. 12A is a conceptual diagram illustrating a backup path #A1 in an Xhaul network.
Figure 12B:
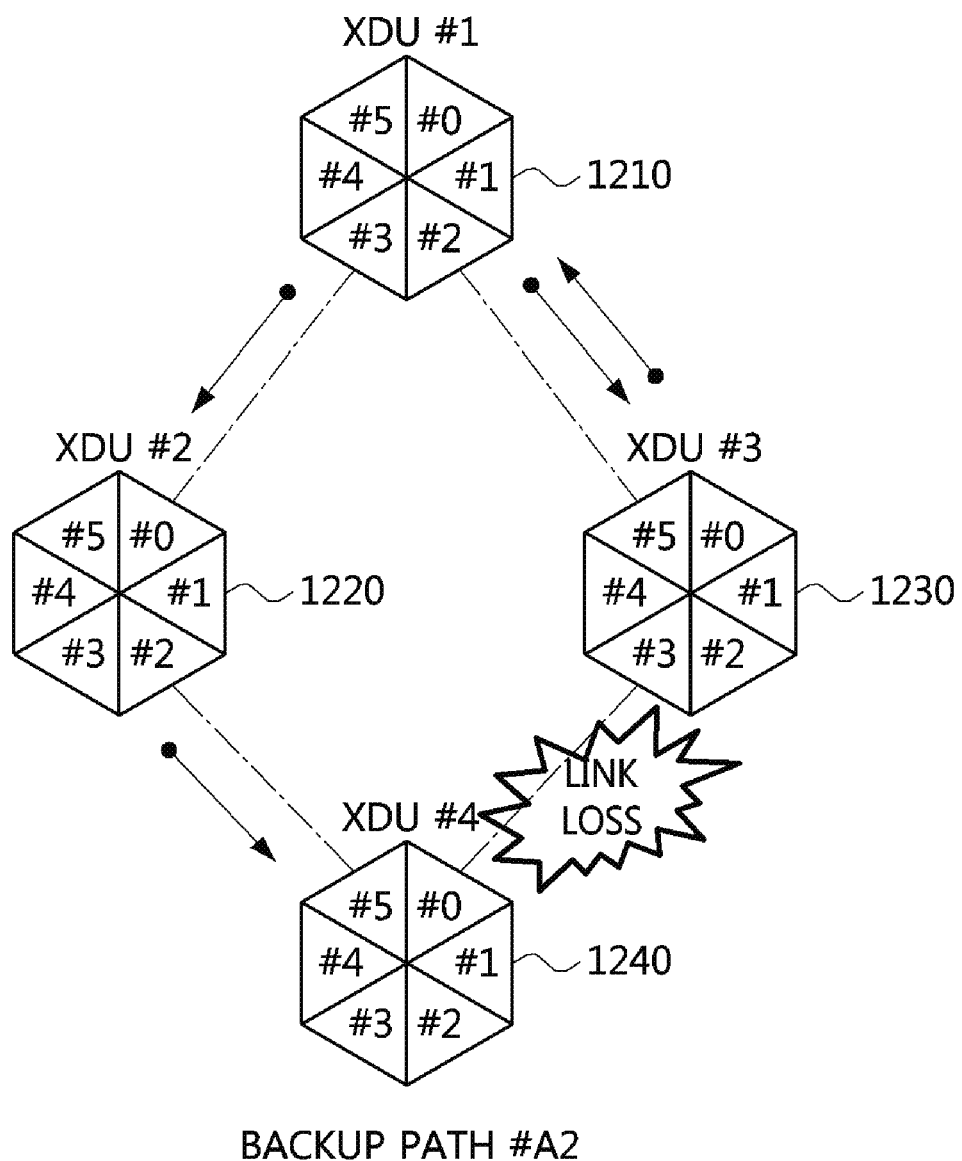
FIG. 12B is a conceptual diagram illustrating a backup path #A2 in an Xhaul network.
Figure 12C:
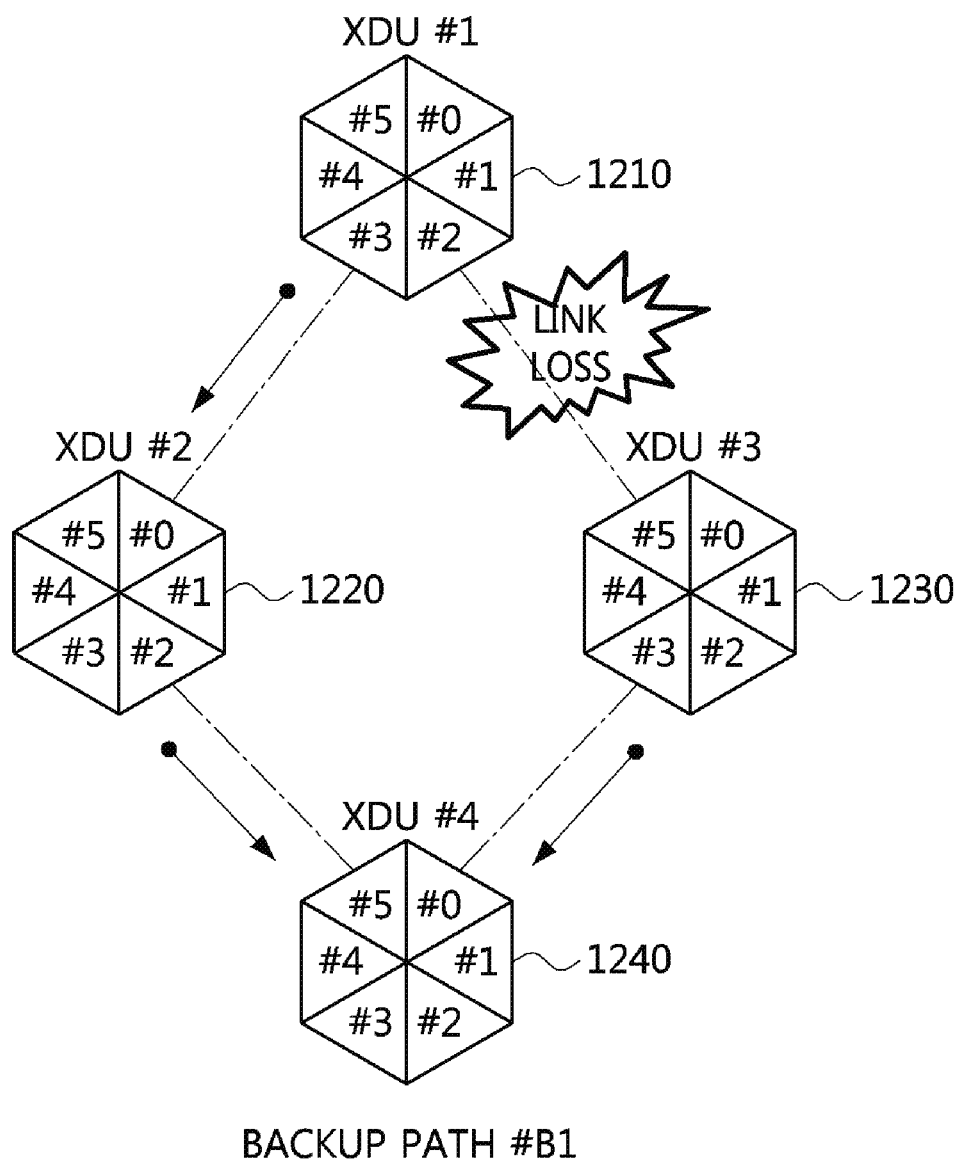
FIG. 12C is a conceptual diagram illustrating a backup path #B1 in an Xhaul network.
Figure 12D:
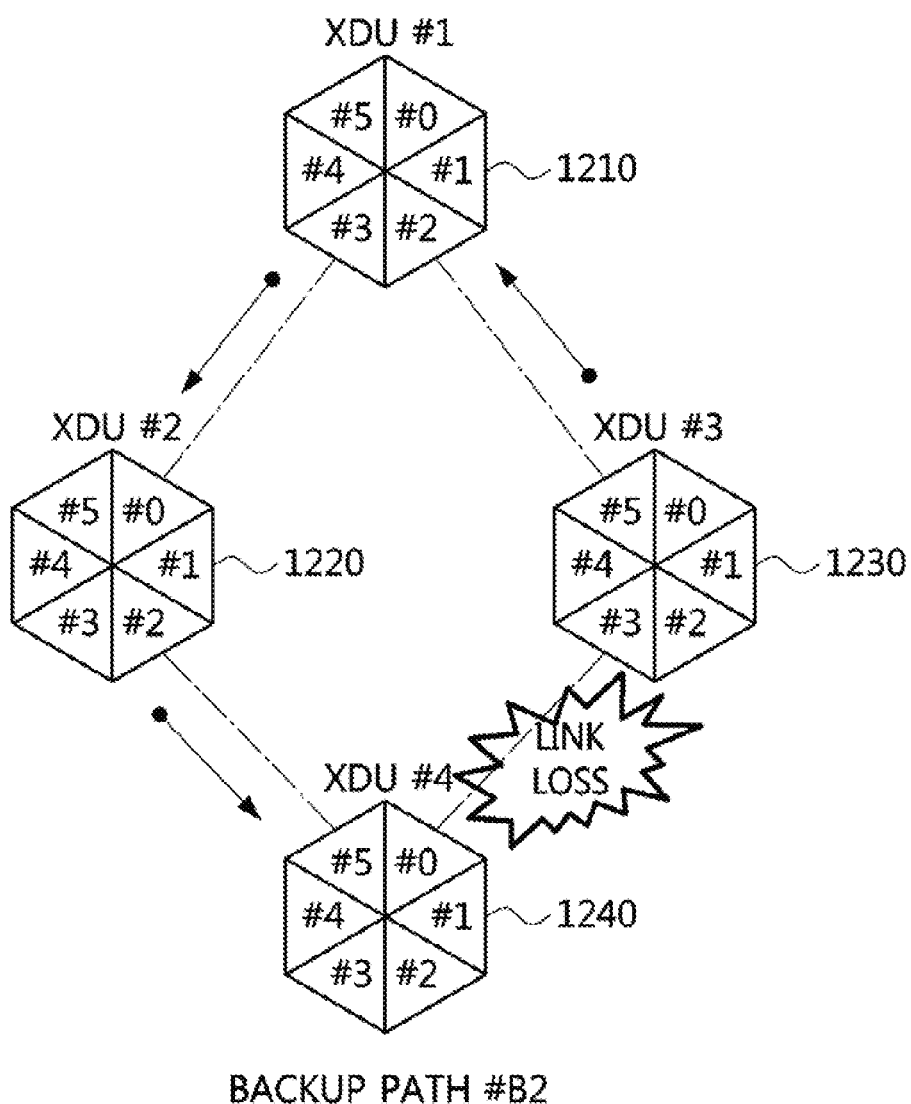
FIG. 12D is a conceptual diagram illustrating a backup path #B2 in an Xhaul network.

FIG. 12A is a conceptual diagram illustrating a backup path #A1 in an Xhaul network, FIG. 12B is a conceptual diagram illustrating a backup path #A2 in an Xhaul network, FIG. 12C is a conceptual diagram illustrating a backup path #B1 in an Xhaul network, and FIG. 12D is a conceptual diagram illustrating a backup path #B2 in an Xhaul network.

Referring to FIGS. 12A to 12D, the backup paths #A1 and #B1 may be used when the path of (XDU #1-XDU #3) is lost. The backup path #A1 may be (XDU #1-XDU #2-XDU

4-XDU #3-XDU #4), and the backup path #B1 may be (XDU #1-XDU #2-XDU #4) and (XDU #3-XDU #4). The backup paths #A2 and #B2 may be used when the path of (XDU #3-XDU #4) is lost. The backup path #A2 may be (XDU #1-XDU #3-XDU #1-XDU #2-XDU #4), and the backup path #B2 may be (XDU #1-XDU #3) and (XDU #1-XDU #2-XDU #4).

Here, the backup paths #A1 and #A2 may be non-optimized backup paths, and the backup paths #B1 and #B2 may be optimized backup paths.

In the non-optimized path, adjacent XDUs (e.g., XDU #3 and XDU #4, or XDU #1 and XDU #3) may be connected in a multi-hop scheme. When the non-optimized backup path is configured not to overlap with the original path, the backup path may be configured based on one backup path forwarding table even when a specific link is lost in the original path. When the optimized backup path is used, configuration of the backup path forwarding table may vary depending on a lost link (e.g., an XDU initiating the backup path activation procedure). Therefore, a backup path may be configured for each flow ID and an initiator XDU sector ID, and the forwarding table may be configured in all the XDUs belonging to the backup path. Also, when the optimized backup path is used, additional functions for data reordering after data forwarding may be considered.

When the path of (XDU #1-XDU #3) is lost, a configuration procedure for the backup path #A1 or #B1 may be performed as follows.

Figure 13:
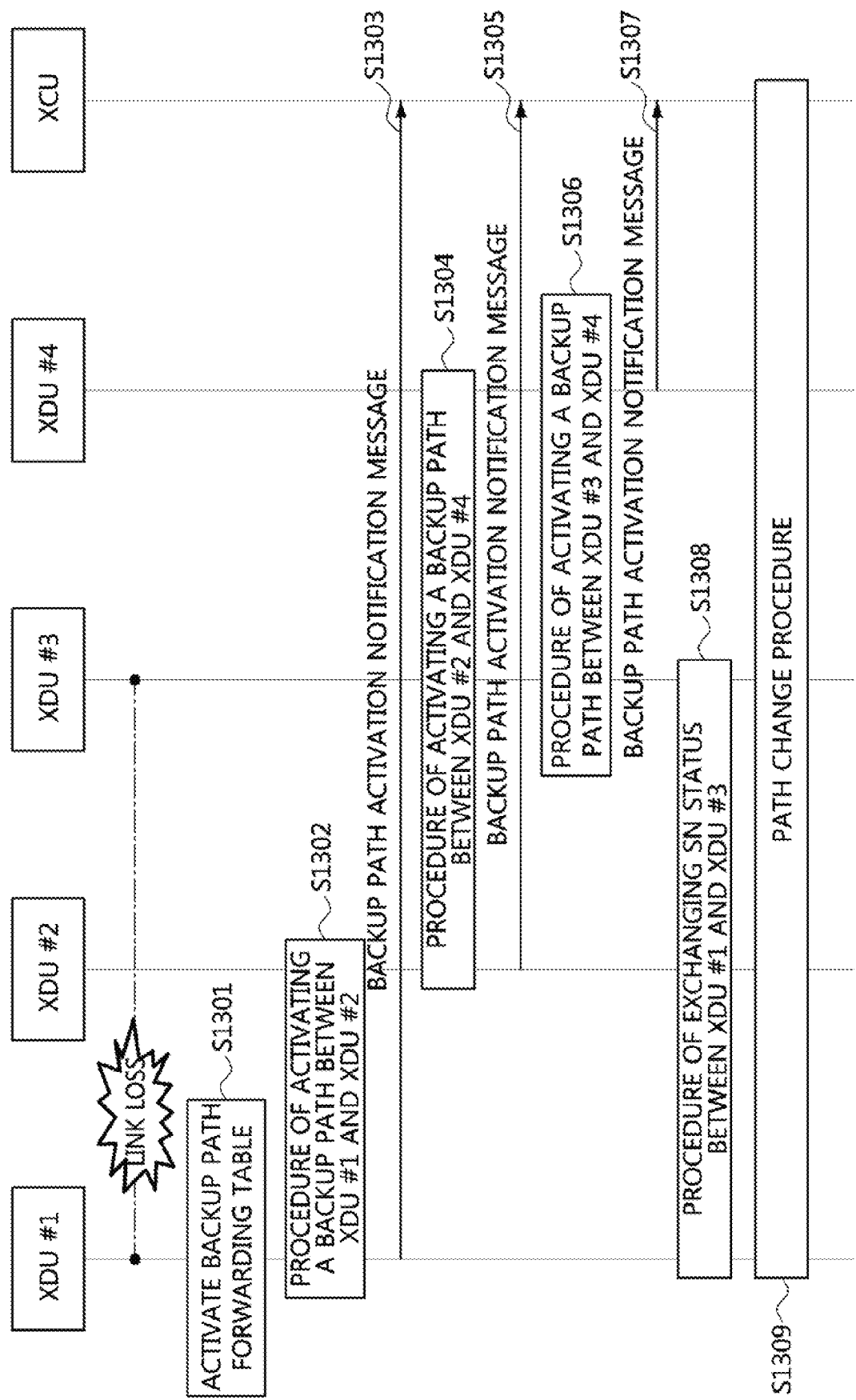
FIG. 13 is a sequence chart illustrating a first embodiment of a backup path configuration method in an Xhaul network.

FIG. 13 is a sequence chart illustrating a first embodiment of a backup path configuration method in an Xhaul network.

Referring to FIG. 13, an Xhaul network may include an XDU #1, an XDU #2, an XDU #3, an XDU #4, an XCU, and the like. Each of the XDU #1, the XDU #2, the XDU #3, the XDU #4, and the XCU may be configured identically to or similarly to the communication node 200 shown in FIG. 2, and may support the protocol structures shown in FIG. 6 and FIGS. 7A to 7D. Also, each of the XDU #1, the XDU #2, the XDU #3, and the XDU #4 may comprise a plurality of sectors identically to or similarly to the communication nodes 510, 520 and 530 shown in FIG. 5. The XDU #1, the XDU #2, the XDU #3, and the XDU #4 may be the XDU 1210, the XDU 1220, the XDU 1230, and the XDU 1240 shown in FIGS. 12A and 12B. That is, the deployment structure of the XDU #1, the XDU #2, the XDU #3, and the XDU #4 may be the same as the deployment structure of the XDU 1210, the XDU 1220, the XDU 1230, and the XDU 1240, which is shown in FIGS. 12A and 12B.

When the original path is (XDU #1-XDU #3-XDU #4) and a loss of the path (XDU #1-XDU #3) is detected, the XDU #1 may activate a backup path forwarding table configured by the XCU (S1301). The backup path forwarding table may indicate a forwarding rule according to the backup path #A1 or #B1. Also, the XDU #1 may deactivate (or delete) an original path forwarding table associated with the XDU #3 belonging to the lost path (XDU #1-XDU #3), and may stop data transmission to the XDU #3.

The XDU #1 may perform a backup path activation procedure with the XDUs belonging to the backup path #A1 or #B1. In the backup path activation procedure, a backup path activation message may be transmitted to a target XDU for each flow ID. However, when the target XDUs for the flow IDs are the same, the backup path activation procedure for the flow IDs may be performed by a single backup path activation message. In this case, the backup path activation message may include a plurality of flow IDs. One or more data transmission paths and one control information transmission path may be configured through the backup path activation procedure.

For example, the XDU #1 may perform the backup path activation procedure with the XDU #2 belonging to the backup path #A1 or #B1 (S1302). When a radio link of (XDU #1-XDU #2) is not configured, the XDU #1 may perform a procedure of configuring the radio link of (XDU #1-XDU #2). The XDU #1 may transmit a backup path activation message to the XDU #2 through the radio link of (XDU #1-XDU #2). The backup path activation message may include a flow ID, an initiator XDU sector ID, a target XDU sector ID, a reason code, and the like. The backup path may be configured for each flow ID. The initiator XDU sector ID may indicate the XDU (e.g., XDU #1) that initiated the backup path activation procedure. The target XDU sector ID may be a counterpart XDU of the XDU (e.g., XDU #1) indicated by the initiator XDU sector ID among the XDUs belonging to the lost path (e.g., (XDU #1-XDU #3)). The reason code may indicate a reason for initiating the backup path activation procedure.

The XDU #2 may receive the backup path activation message from the XDU #1, and identify that the activation of the backup path #A1 or #B1 is requested based on the backup path activation message. In this case, the XDU #2 may activate a backup path forwarding table, and transmit a backup path activation response message, which is a response to the backup path activation message, to the XDU #1. When the backup path activation response message is received from the XDU #2, the XDU #1 may determine that the backup path of (XDU #1-XDU #2) is activated. The XDU #1 may transmit to the XCU a backup path activation notification message indicating that the backup path of (XDU #1-XDU #2) is activated (S1303). The backup path activation notification message may include the flow ID, the initiator XDU ID, the target XDU ID, the reason code, and the like. When the backup path activation notification message is received from the XDU #1, the XCU may determine that the backup path of (XDU #1-XDU #2) is activated.

After activating the backup path forwarding table, the XDU #2 may perform a backup path activation procedure with the XDU #4 belonging to the backup path #A1 or #B1 (S1304). When a radio link of (XDU #2-XDU #4) is not configured, the XDU #2 may perform a procedure of configuring the radio link of (XDU #2-XDU #4). The XDU #2 may transmit a backup path activation message to the XDU #4 through the radio link of (XDU #2-XDU #4). The backup path activation message may include the flow ID, the initiator XDU sector ID, the target XDU sector ID, the reason code, and the like.

The XDU #4 may receive the backup path activation message from the XDU #2, and identify that the activation of the backup path #A1 or #B1 is requested based on the backup path activation message. In this case, the XDU #4 may activate a backup path forwarding table, and transmit a backup path activation response message, which is a response to the backup path activation message, to the XDU #2. When the backup path activation response message is received from the XDU #4, the XDU #2 may determine that the backup path of (XDU #2-XDU #4) is activated. The XDU #2 may transmit to the XCU a backup path activation notification message indicating that the backup path of (XDU #2-XDU #4) is activated (S1305). The backup path activation notification message may include the flow ID, the initiator XDU ID, the target XDU ID, the reason code, and the like. When the backup path activation notification message is received from the XDU #2, the XCU may determine that the backup path of (XDU #2-XDU #4) is activated.

After activating the backup path forwarding table, since the XDU #4 is the last XDU belonging to the backup path #B1 when the backup path #B1 is activated, the XDU #4 may not transmit a backup path activation message to another XDU (e.g., XDU #3). That is, the backup path activation procedure may be terminated. In this case, a forwarding table in the XDU #3 that does not receive a backup path activation message may be maintained as the original path forwarding table as shown in Table 1 below.

TABLE 1

| Flow ID | Reception sector ID | Transmission sector ID | Target sector ID |
|---------|---------------------|------------------------|------------------|
| 1       | 3F                  | 3D                     | 4A               |

In Table 1, the reception sector ID may indicate a sector of the XDU #3 that receives data from the XDU #1, the transmission sector ID may indicate a sector of the XDU #3 that transmits data to the XDU #4, and the target sector ID may indicate a sector of the XDU #4 that receives the data from the XDU #3.

Meanwhile, the XDU #4 may perform the backup path activation procedure with the XDU #3 belonging to the backup path #A1 when the backup path #A1 is activated (S1306). The XDU #4 may transmit a backup path activation message to the XDU #3 through the radio link (XDU #3-XDU #4). The backup path activation message may include the flow ID, the initiator XDU sector ID, the target XDU sector ID, the reason code, and the like.

The XDU #3 may receive the backup path activation message from the XDU #4, and identify that the activation of the backup path #A1 is requested based on the backup path activation message. In this case, the XDU #3 may activate the backup path forwarding table, and the forwarding table in the XDU #3 may be configured as shown in Table 2 below.

TABLE 2

| Flow ID | Reception sector ID | Transmission sector ID | Target sector ID |
|---------|---------------------|------------------------|------------------|
| 1       | 3D                  | 3D                     | 4A               |

That is, when the backup path forwarding table is activated in the XDU #3, the forwarding table may be changed from the forwarding table of Table 1 to the forwarding table of Table 2. In Table 2, the reception sector ID may indicate a sector of the XDU #3 that receives data from the XDU #4, the transmission sector ID may indicate a sector of the XDU #3 that transmits data to the XDU #4, and the target sector ID may indicate a sector of the XDU #4 that receives the data from the XDU #3.

When the backup path forwarding table is activated, the XDU #3 may transmit a backup path activation response message, which is a response to the backup path activation message, to the XDU #4. When the backup path activation response message is received from the XDU #3, the XDU #4 may determine that the backup path of (XDU #3-XDU #4) is activated. The XDU #4 may transmit a backup path activation notification message indicating that the backup path of (XDU #3-XDU #4) is activated to the XCU (S1307). The backup path activation notification message may include a flow ID, an initiator XDU ID, a target XDU ID, a reason code, and the like. When the backup path activation notification message is received from the XDU #4, the XCU may determine that the backup path of (XDU #3-XDU #4) is activated.

Meanwhile, in order to efficiently retransmit the data, an SN status exchange procedure may be performed between the XDUs belonging to the lost path of (XDU #1-XDU #3) (S1308). In this case, the XDU #3 may transmit an SN status report message (e.g., SN status transfer message) to the XDU #1, and the XDU #1 may transmit an SN status report message to the XDU #3. The SN exchanged in the SN status exchange procedure may be an MUTP SN. The XDU #1 may determine retransmission data based on the SN indicated by the SN status report message of the XDU #3, and may transmit the determined retransmission data through the backup path.

On the other hand, the XCU may identify that the backup path is activated based on the backup path activation notification message, and may configure the new path by performing a path change procedure (S1309).

Meanwhile, when the path of (XDU #3→XDU #4) is lost, a configuration procedure for the backup path #A2 or #B2 may be performed based on the embodiment of FIG. 13 described above. When the backup path #A2 is configured, the forwarding table of the XDU #3 may be configured as shown in Table 3 below.

TABLE 3

| Flow ID | Reception sector ID | Transmission sector ID | Target sector ID |
|---------|---------------------|------------------------|------------------|
| 1       | 3F                  | 3F                     | 1B               |

In Table 3, the reception sector ID may indicate a sector of the XDU #3 that receives data from the XDU #1, the transmission sector ID may indicate a sector of the XDU #3 that transmits data to the XDU #1, and the target sector ID may indicate a sector of the XDU #1 that receives the data from the XDU #3. When the backup path #B2 is configured, the forwarding table in the XDU #3 may be configured as shown in Table 3 below.

TABLE 4

| Flow ID | Reception sector ID | Transmission sector ID | Target sector ID |
|---------|---------------------|------------------------|------------------|
| 1       | —                   | 3F                     | 1B               |

In Table 4, the reception sector ID may not be configured, the transmission sector ID may indicate a sector of the XDU #3 that transmits data to the XDU #1, and the target sector ID may indicate a sector of the XDU #1 that receives the data from the XDU #3.

On the other hand, after the backup path activation procedure is completed, a data transmission method for preventing communication performance degradation in the XDU located at the end of the backup path. For example, after the activation procedure of the backup path #A2 is completed, data may be transmitted in the backup path #A2 as follows.

FIG. 14 is a sequence chart illustrating a first embodiment of a data transmission method in the backup path #A2.

Referring to FIG. 14, an Xhaul network may include an XDU #1, an XDU #2, an XDU #3, an XDU #4, an XCU, and the like. Each of the XDU #1, the XDU #2, the XDU #3, the XDU #4, and the XCU may be configured identically to or similarly to the communication node 200 shown in FIG. 2, and may support the protocol structures shown in FIG. 6 and FIGS. 7A to 7D. Also, each of the XDU #1, the XDU #2, the XDU #3, and the XDU #4 may comprise a plurality of sectors identically to or similarly to the communication nodes 510, 520 and 530 shown in FIG. 5. The XDU #1, the XDU #2, the XDU #3, and the XDU #4 may be the XDU 1210, the XDU 1220, the XDU 1230, and the XDU 1240 shown in FIGS. 12A and 12B. That is, the deployment structure of the XDU #1, the XDU #2, the XDU #3, and the XDU #4 may be the same as the deployment structure of the XDU 1210, the XDU 1220, the XDU 1230, and the XDU 1240, which is shown in FIGS. 12A and 12B.

When the backup path #A2 is activated, an SN status exchange procedure may be performed between the XDUs belonging to the lost path of (XDU #3-XDU #4) (S1401). In this case, the XDU #3 may transmit an SN status report message to the XDU #4, and the XDU #4 may transmit an SN status report message to the XDU #3. The SN exchanged in the SN status exchange procedure may be an MUTP SN. In the step S1401, an SN of the data stored in the buffer of the XDU #3 may be compared with an SN of the data stored in the buffer of the XDU #4, and retransmission data may be determined based on the comparison result.

On the other hand, the XDU #1 may receive data from another communication node (e.g., another XDU, a communication node belonging to the access network, a communication node belonging to the core network), and may transmit the received data to the XDU #3 belonging to the backup path #A2 (S1402). The XDU #3 may receive the data from the XDU #1 and may transmit the received data to the XDU #1 belonging to the backup path #A2 (S1403). The XDU #1 may receive the data from the XDU #3, and may transmit the received data to the XDU #2 belonging to the backup path #A2 (S1404). The XDU #2 may receive data from the XDU #1, and transmit the received data to the XDU #4 belonging to the backup path #A2 (S1405). The XDU #4 may receive the data from the XDU #1, and may transmit the received data to another communication node (e.g., another XDU, a communication node belonging to the access network, or a communication node belonging to the core network).

Meanwhile, additional functions may be required for sequential transmission of the data in the backup path #B2, as compared to the backup path #A2 described above. The initiator XDU (e.g., XDU #3) may transmit data except data successfully received at the receiving XDU (e.g., XDU #4). Therefore, the initiator XDU may not transmit data having a specific SN. The joint XDU (e.g., XDU #4) may perform buffering of data for reordering of the data when the joint XDU does not know information (e.g., the specific SN) of the data that the initiator XDU does not transmit. The data transmission delay may increase due to the data buffering operation in the joint XDU.

In order to solve this problem, when the backup path #B2 is activated, the initiator XDU may transmit an end marker message indicating that there is no data in the buffer after transmitting all the data stored in the buffer. The end marker message may be transmitted up to the joint XDU. The end marker message may include a flow ID, and may be configured for a backup path different for each flow. That is, the end marker message may be transmitted for each flow ID. The joint XDU may not perform data reordering because it does not know the SN of the data transmitted from the initiator XDU. In this case, the joint XDU may forward the data received through the original path to the next communication node after forwarding all data received through the backup path #B2. The XDUs belonging to the backup path #B2 between the initiator XDU and the joint XDU may forward the data stored in its buffer after forwarding all the data received from the backup path #B2. Also, the XDUs may transmit an end marker message indicating that there is no data in the buffer.

In the backup path #B2 described above, a data transmission procedure may be performed as follows.

FIG. 15 is a sequence chart illustrating a first embodiment of a data transmission method in the backup path #B2.

Referring to FIG. 15, an Xhaul network may include an XDU #1, an XDU #2, an XDU #3, an XDU #4, an XCU, and the like. Each of the XDU #1, the XDU #2, the XDU #3, the XDU #4, and the XCU may be configured identically to or similarly to the communication node 200 shown in FIG. 2, and may support the protocol structures shown in FIG. 6 and FIGS. 7A to 7D. Also, each of the XDU #1, the XDU #2, the XDU #3, and the XDU #4 may comprise a plurality of sectors identically to or similarly to the communication nodes 510, 520 and 530 shown in FIG. 5. The XDU #1, the XDU #2, the XDU #3, and the XDU #4 may be the XDU 1210, the XDU 1220, the XDU 1230, and the XDU 1240 shown in FIGS. 12A and 12B. That is, the deployment structure of the XDU #1, the XDU #2, the XDU #3, and the XDU #4 may be the same as the deployment structure of the XDU 1210, the XDU 1220, the XDU 1230, and the XDU 1240, which is shown in FIGS. 12A and 12B.

When the backup path #B2 is activated, an SN status exchange procedure may be performed between the XDUs belonging to the lost path (XDU #3-XDU #4) (S1501). In this case, the XDU #3 may transmit an SN status report message to the XDU #4, and the XDU #4 may transmit an SN status report message to the XDU #3. The SN exchanged in the SN status exchange procedure may be an MUTP SN. In the step S1501, an SN of the data stored in the buffer of the XDU #3 may be compared with an SN of the data stored in the buffer of the XDU #4, and retransmission data may be determined based on the comparison result.

After the step S1501 is completed, the XDU #3 may transmit the data stored in the buffer to the XDU #1 (S1502). The XDU #1 may receive the data from the XDU #3, and may transmit the received data to the XDU #2 belonging to the backup path #B2 (S1503). The XDU #2 may receive the data from the XDU #1, and transmit the received data to the XDU #4 belonging to the backup path #B2 (S1504). The XDU #4 may receive the data from the XDU #2. Since the XDU #4 does not know the SN of the received data, the XDU #4 may forward the data to the next communication node without performing data reordering operation On the other hand, when there is no data in the buffer of the XDU #3, the XDU #3 may transmit to the XDU #1 an end marker message indicating that no data exists in the buffer (S1505). The end marker message may be transmitted for each flow ID. The XDU #1 may receive the end marker message from the XDU #3, and may determine that no data exists in the buffer of the XDU #3 based on the end marker message.

The XDU #1 may receive data from another communication node (e.g., another XDU, a communication node belonging to the access network, a communication node belonging to the core network). In this case, the XDU #1 may transmit the data and the end marker message of the XDU #3 to the XDU #2 belonging to the backup path #B2 (S1506). The XDU #2 may receive the data and the end marker message of the XDU #3 from the XDU #1, and transmit the data and the end marker message of the XDU #3 to the XDU #4 belonging to the backup path #B2

(S1507). The XDU #4 may receive the data and the end marker message of the XDU #3 from the XDU #2. In this case, the XDU #4 may determine that there is no data in the buffer of the XDU #3 based on the end marker message, and may transmit the data to the next communication node.

On the other hand, in the backup paths #B1 and #B2, the joint XDU may operate as follows.

Figure 16A:
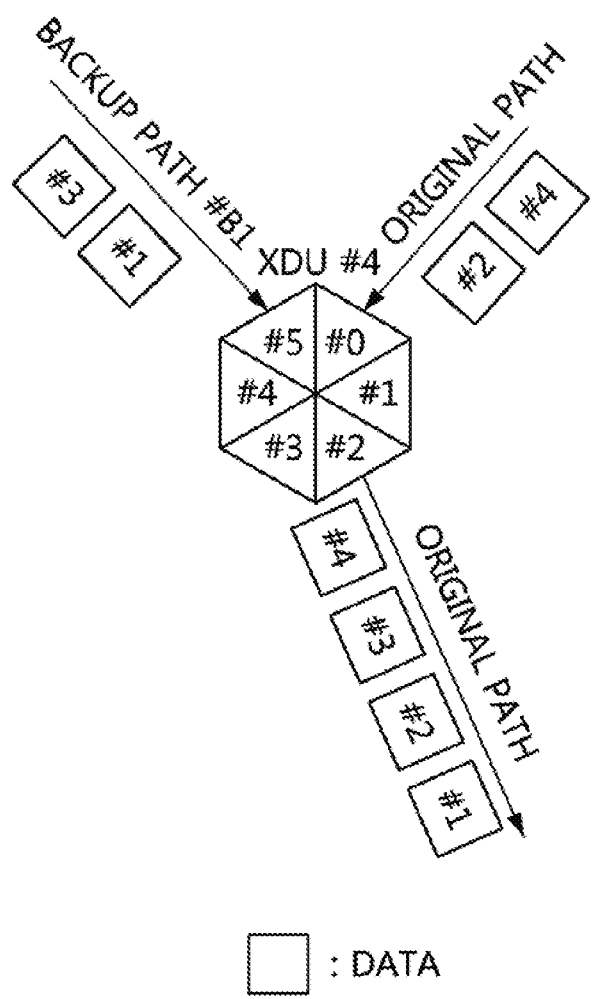
FIG. 16A is a conceptual diagram illustrating a first embodiment of an operation method of a joint XDU in the backup path #B1.

FIG. 16A is a conceptual diagram illustrating a first embodiment of an operation method of a joint XDU in the backup path #B1.

Referring to FIG. 16A, a joint XDU in the backup path #B1 may be the XDU #4. Since the XDU #4 is a receiving XDU for the XDU #3 (e.g., the initiator XDU) in the original path, the XDU #4 may know the SN of the XDU #3. Therefore, the XDU #4 may perform data reordering based on SNs (e.g., SN #2 and SN #4) of data received through the original path and SNs (e.g., SN #1 and SN #3) of data received through the backup path #B2, and transmit the reordered data through the original path.

Figure 16B:
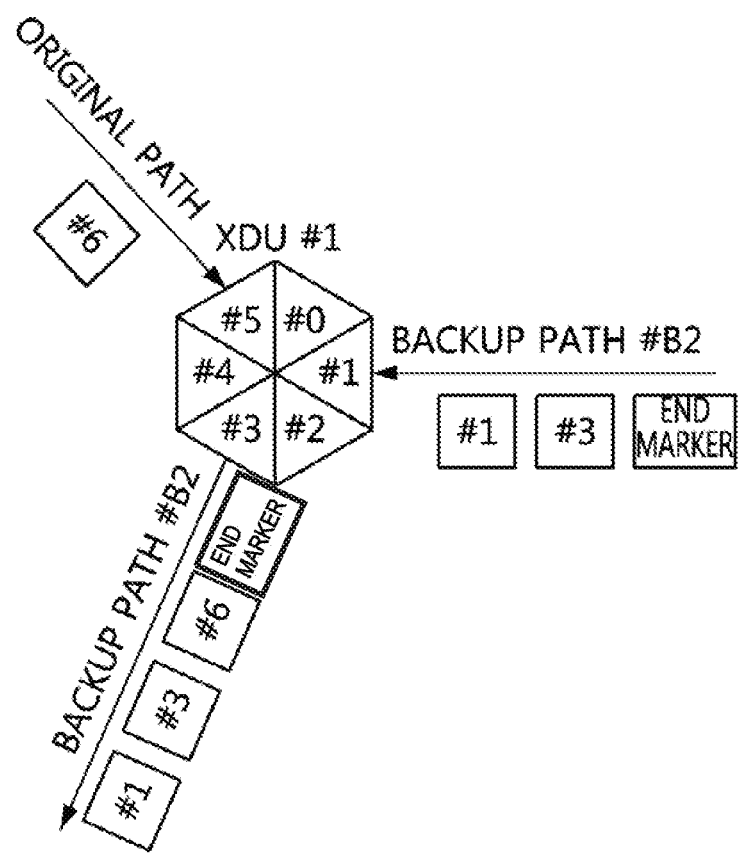
FIG. 16B is a conceptual diagram illustrating a first embodiment of an operation method of a joint XDU in the backup path #B2.

FIG. 16B is a conceptual diagram illustrating a first embodiment of an operation method of a joint XDU in the backup path #B2.

Referring to FIG. 16B, a joint XDU in the backup path #B1 may be the XDU #1. Since the XDU #1 does not know the SN of the XDU #3, the XDU #1 may transmit data received from the XDU #3 to the next communication node without performing data reordering. That is, the XDU #1 may transmit the data received from the XDU #3 to the next XDU until the XDU #3 receives an end marker message of the XDU #3.

Meanwhile, the embodiments described above may be summarized as follows.

Figure 17B:
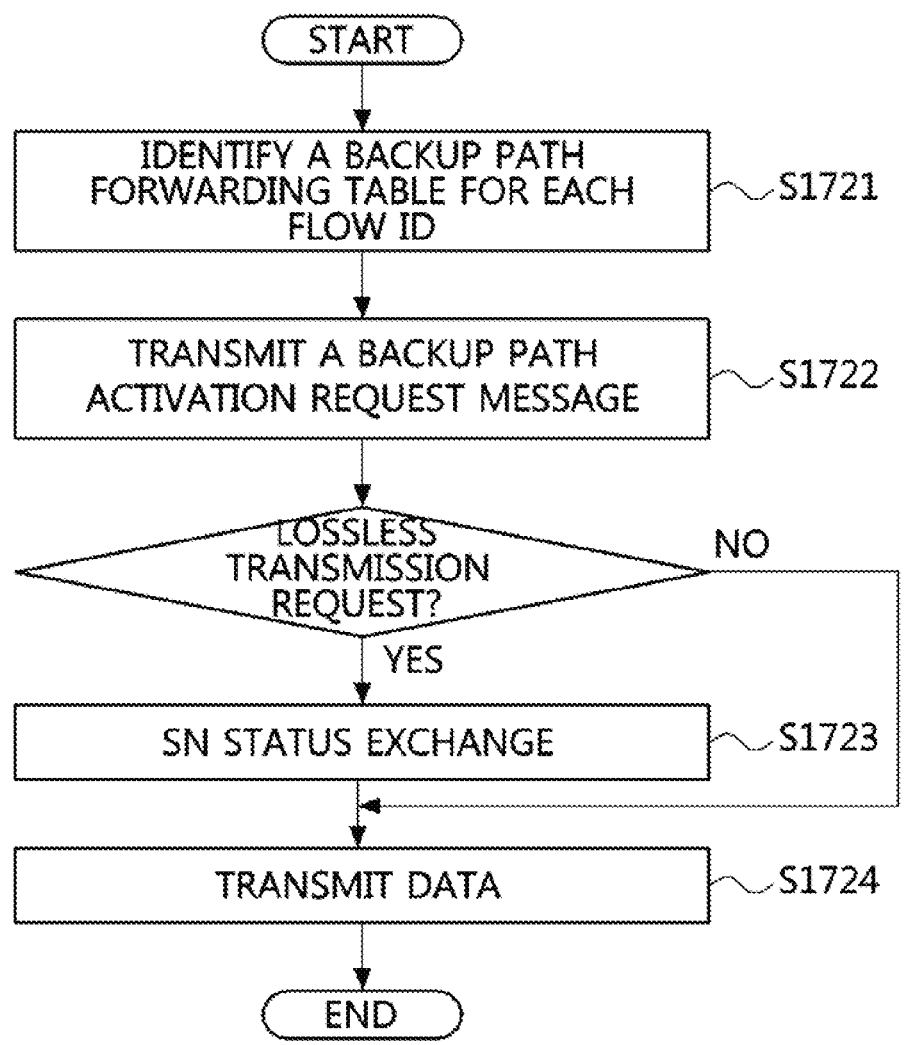
FIG. 17B is a flow chart illustrating a first embodiment of a method of transmitting and receiving data through a backup path in an Xhaul network.

FIG. 17A is a flow chart illustrating a first embodiment of a path change method in an Xhaul network, FIG. 17B is a flow chart illustrating a first embodiment of a method of transmitting and receiving data through a backup path in an Xhaul network, and FIG. 17C is a flow chart illustrating a second embodiment of a method of transmitting and receiving data through a backup path in an Xhaul network.

Referring to FIGS. 17A to 17C, a procedure for recovering a link loss may be classified into a lower layer recovery procedure and an upper layer recovery procedure. In the lower layer recovery procedure, the XDU (e.g., a lower layer of the XDU) may periodically perform a monitoring operation on a radio link (S1711). When a beam failure is detected by the monitoring operation, the XDU (e.g., the lower layer of the XDU) may change a current beam to another beam, and attempt connection recovery through another beam. For example, the XDU (e.g., the lower layer of the XDU) may attempt to recover the connection using a different beam within the same sector.

When the connection recovery (e.g., beam change) fails, the lower layer of the XDU may inform an upper layer of the XDU that the connection recovery (e.g., beam change) has failed. When it is determined that the connection recovery (e.g., beam change) in the lower layer of the XDU has failed, the upper layer recovery procedure may be performed. In the upper layer recovery procedure, a backup path operation may vary according to service requirements.

If a loss period of the radio link cannot be expected, the backup path may be operated according to a latency requirement of the service. When the service allows a higher latency, the XDU (e.g., the upper layer of the XDU) may estimate a time required for activation of the backup path (S1712). In the step S1712, a link delay, the number of hops of the backup path, the load of the backup path, and the like may be estimated. If the time estimated in the step S1712 (or, the link delay, the number of hops of the backup path, the load of the backup path, or the like) is smaller than a predetermined threshold, the XDU (e.g., the upper layer of the XDU) may perform a backup path activation procedure (S1713).

When the service requires a lower latency, the XDU (e.g., the upper layer of the XDU), if it is determined that the lower layer of the XDU has failed the connection recovery (e.g., beam change), the XDU may immediately perform the backup path activation procedure (S1713). Alternatively, when the service is a best-effort based service, the XDU may request the XCU to change the path without using the backup path (S1714).

In the backup path activation procedure, the XDU may identify whether a backup path table for each flow ID exists (S1721). If the backup path table exists, the XDU may transmit a backup path activation request message to a target sector (S1722).

When lossless traffic transmission is required, the XDU may perform an SN status exchange procedure (S1723). That is, the XDU may identify an SN status by transmitting and receiving the SN status exchange messages, and may identify data not received at the counterpart node based on the SN status. Accordingly, the XDU may retransmit the data that has not been received at the counterpart node (S1724). Also, the XDU may transmit data based on the activated backup path table (S1724). On the other hand, when lossless traffic transmission is not required, the XDU may transmit data based on the activated backup path table without the SN status exchange and the data retransmission (S1724).

An XDU that does not directly detect the beam failure (e.g., beam loss) among the XDUs constituting the backup path may perform the backup path activation procedure based on a backup path activation request message received from another communication node. That is, the XDU may receive the backup path activation request message from another communication node (S1731). When the backup path activation request message is received, the XDU may transmit a backup path activation response message (S1732). In addition, the XDU may activate the backup path.

The XDU may identify the backup path table for each flow ID. When it is determined that the XDU is a joint node for the corresponding flow ID as a result of identifying the backup path table for each flow ID, the XDU may operate as a joint node without an additional backup path activation procedure (S1733). For example, the XDU may perform operations according to the embodiments of FIGS. 16A and 16B described above.

On the other hand, when it is determined that the XDU is not a joint node for the corresponding flow ID as a result of identifying the backup path table for each flow ID, the XDU may transmit a backup path activation request message to a target sector indicated by the backup path table (S1734). The XDU may receive a backup path activation response message from the target sector (S1735). Thereafter, the XDU may transmit data to the target sector (S1736).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for changing a path, performed by a first Xhaul distributed unit (XDU) in an Xhaul network including an Xhaul centralized unit (XCU) and a plurality of XDUs including the first XDU, a second XDU, a third XDU, and a fourth XDU, wherein an original path is a path of the first XDU to the third XDU to the fourth XDU and a backup path for the original path is a path of the first XDU to the second XDU to the fourth XDU, the method comprising:

activating a forwarding table indicating a forwarding rule in the backup path when a loss of a path of the first XDU to the third XDU is detected;

performing an activation procedure of a path of the first XDU to the second XDU belonging to the backup path with the second XDU; and transmitting to the XCU a backup path activation notification message indicating that the activation of the path of the first XDU to the second XDU is complete.

2. The method according to claim 1, wherein the backup path is configured for each flow identifier (ID).

3. The method according to claim 1, wherein the performing an activation procedure with the second XDU further comprises:

transmitting to the second XDU a backup path activation message including a flow ID, an initiator XDU sector ID, a target XDU sector ID, and a reason code; and receiving from the second XDU a backup path activation response message in response to the backup path activation message.

4. The method according to claim 1, further comprising performing a procedure for exchanging a sequence number (SN) status with the third XDU.

5. The method according to claim 1, wherein the backup path is preconfigured by the XCU, and the change from the original path to the backup path is performed without control of the XCU.

* * * * *